(12) United States Patent
Inano et al.

(10) Patent No.: US 7,536,152 B2
(45) Date of Patent: May 19, 2009

(54) INFORMATION ACCESS SYSTEM AND ACTIVE-TYPE CONTACTLESS INFORMATION STORAGE DEVICE

(75) Inventors: Satoshi Inano, Kawasaki (JP); Isamu Yamada, Kawasaki (JP); Shinichi Shiotsu, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 11/330,173

(22) Filed: Jan. 12, 2006

(65) Prior Publication Data

US 2007/0167139 A1     Jul. 19, 2007

(51) Int. Cl.
*H04B 7/00*      (2006.01)
*H04B 1/50*      (2006.01)
*H04B 15/00*     (2006.01)
*G08C 19/00*     (2006.01)

(52) U.S. Cl. .................. 455/41.2; 455/41.3; 455/88; 455/63.3; 340/10.2; 340/505; 340/825.73

(58) Field of Classification Search ............. 455/88
See application file for complete search history.

(56) References Cited

U.S. PATENT DOCUMENTS

| | | | | |
|---|---|---|---|---|
| 5,978,655 A | * | 11/1999 | Ohura et al. | 455/41.1 |
| 6,812,824 B1 | * | 11/2004 | Goldinger et al. | 340/10.1 |
| 6,836,472 B2 | * | 12/2004 | O'Toole et al. | 370/335 |
| 6,922,402 B1 | | 7/2005 | Ko | |
| 2001/0040507 A1 | * | 11/2001 | Eckstein et al. | 340/572.4 |
| 2005/0156742 A1 | * | 7/2005 | Fujii | 340/572.7 |
| 2006/0022800 A1 | * | 2/2006 | Krishna et al. | 340/10.2 |
| 2006/0038658 A1 | * | 2/2006 | Jarvis et al. | 340/10.1 |

FOREIGN PATENT DOCUMENTS

| | | |
|---|---|---|
| JP | 98/16849 | 4/1998 |
| JP | 2000-20651 | 1/2000 |
| JP | 2000-113130 | 4/2000 |
| JP | 2000-187711 | 7/2000 |
| JP | 2001-251210 | 9/2001 |
| WO | 97/43740 | 11/1997 |

\* cited by examiner

*Primary Examiner*—Nick Corsaro
*Assistant Examiner*—Tangela T. Chambers
(74) *Attorney, Agent, or Firm*—Staas & Halsey LLP

(57) ABSTRACT

In an information access system, an active contactless information storage device senses a carrier of an RF signal at a first frequency in first predetermined periods occurring in a predetermined cycle and senses a carrier of an RF signal at a second frequency in second predetermined periods occurring in the predetermined cycle. When the storage device senses and detects a carrier of an RF signal at one of the first and second frequencies in a particular predetermined period, it receives further an ID request signal, and, in response to the ID request signal, transmits a response signal at a corresponding one of the third and fourth frequencies that carries an ID of the active contactless information storage device. This reduces possible interference between reader/writer devices for communicating with the information storage device.

11 Claims, 24 Drawing Sheets

| LIST NO. | SYSTEM ID ID_system | RECEIVING FREQUENCY FOR ID REQUEST | ENCRYPT./DECRYPT. KEY FOR ID REQUEST | TRANSMIT. FREQUENCY FOR RESPONSE | ENCRYPT. KEY FOR RESPONSE | EFFECTIVE PERIOD | STATE OF OPERATION |
|---|---|---|---|---|---|---|---|
| 1 | 100001 | 315.000 | 9B45C83D | 316.000 | 7A42B8EF | 200501010000-200712312359 | ON |
| 2 | 200001 | 315.100 | 5DF84A16 | 316.100 | 35D2901B | 200501010000-200612312359 | ON |
| 3 | 300001 | 315.400 | B7489A8D | 316.400 | 84D3013C | 200501010000-200612312359 | OFF |

FIG. 14

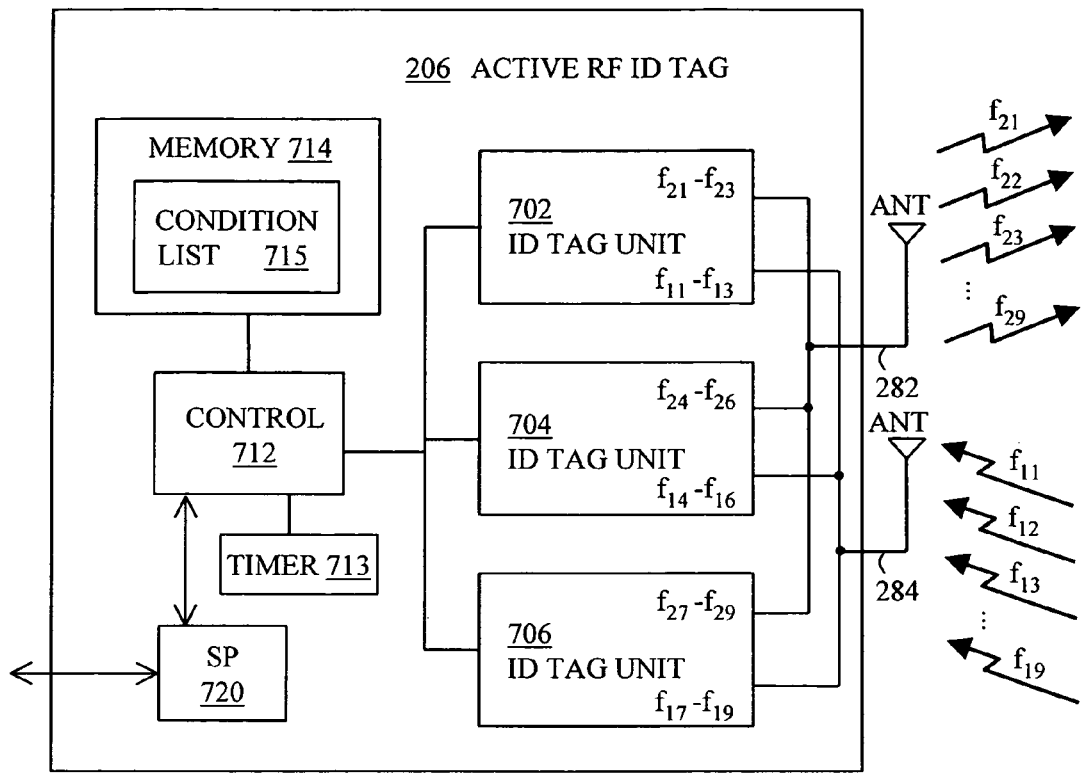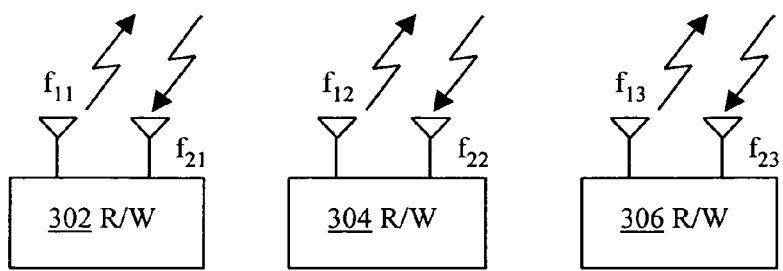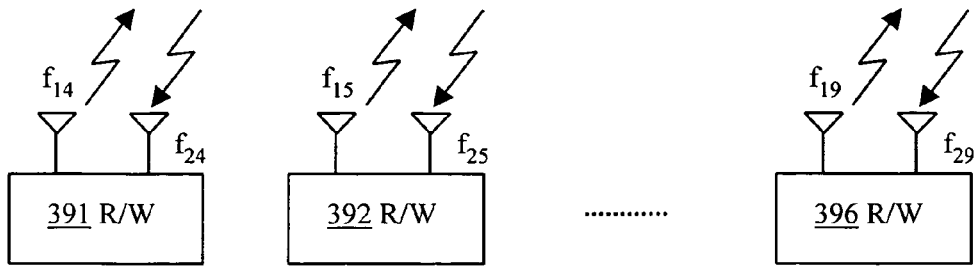
FIG. 16

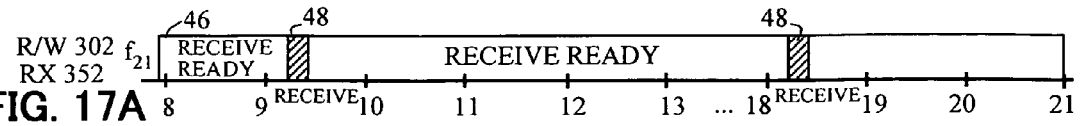
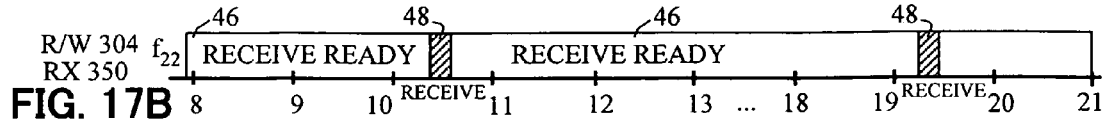
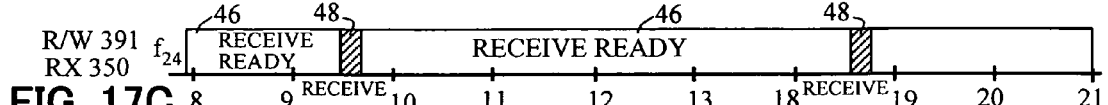
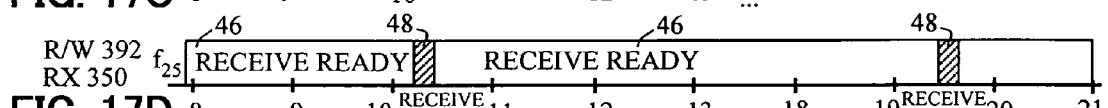
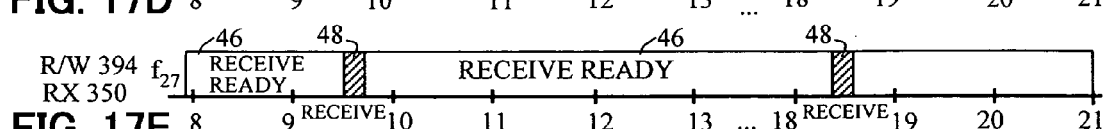
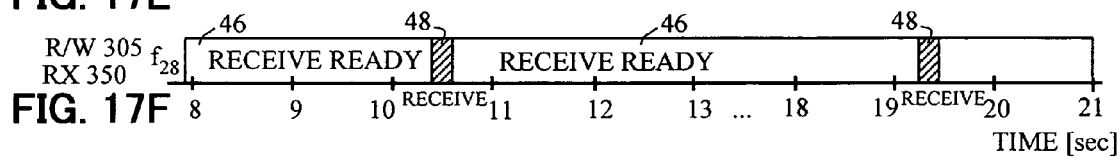
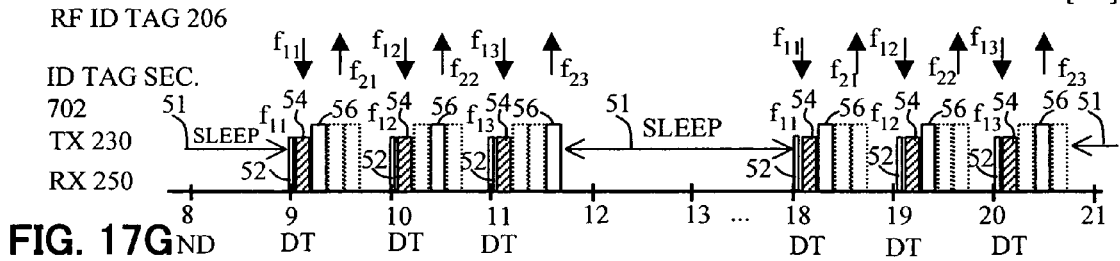
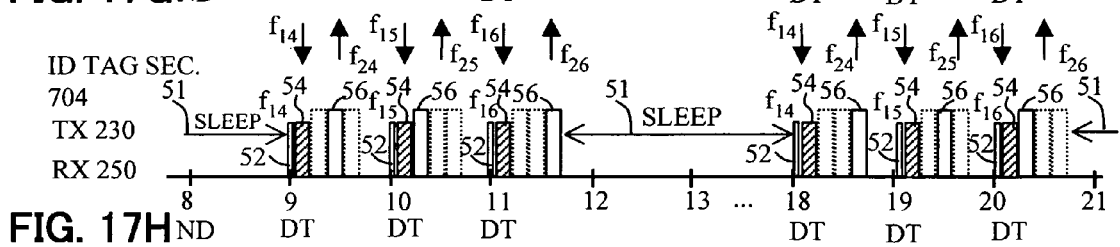
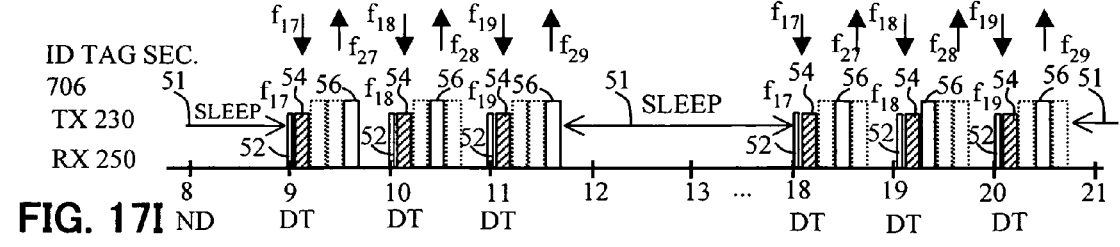

| LIST NO. | CONDITIONAL R/W-1 | CONDITIONAL R/W-2 | DESTINATION R/W FOR UNCONDITIONAL RESPONSE | CONDITION FOR RESPONSE | DESTINATION R/W FOR CONDITIONAL RESPONSE | EFFECTIVE PERIOD | STATE OF OPERATION |
|---|---|---|---|---|---|---|---|
| 1 | R/W-A | R/W-B | (NONE) | AND | R/W-A, R/W-B | 200501010000-200712312359 | ON |
| 2 | R/W-C | R/W-D | (NONE) | AND | R/W-D | 200501010000-200612312359 | ON |
| 3 | R/W-E | R/W-F | R/W-E | TIM- 60 SEC | R/W-F | 200501010000-200612312359 | ON |
| 4 | R/W-G | R/W-H | (NONE) | TIM- 60 SEC | R/W-H | 200501010000-200612312359 | OFF |

714

FIG. 20

INFORMATION ACCESS SYSTEM AND ACTIVE-TYPE CONTACTLESS INFORMATION STORAGE DEVICE

FIELD OF THE INVENTION

The present invention relates generally to an active-type contactless information storage device which a reader/writer device can read and write information from and into in a contactless manner, and in particular to a system for reading an active-type RF ID tag or a contactless IC card with low power consumption.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97/43740 published on Nov. 20, 1997 describes radio frequencies identification device which includes an integrated circuit including a receiver, a transmitter and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much larger range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 describes a method of locking a frequency in a transmitter at each of two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the fist transmitter is detected as the offset of a second corresponding receiver. The second receiver shifts the carrier frequency of the second transmitter, in response to the detected offset, to inform the first transmitter about the detected offset. The first receiver uses the detected offset to correct the carrier frequency of the first transmitter.

International Publication WO 98/16849 which was published on Apr. 23, 1998 describes a system for tracking mobile tags. In the system, cell controllers with multiple antenna modules generate a carrier signal which is received by the tags. The tags shift the frequency of the carrier signal, modulate an identification code onto it, and transmit the resultant tag signal at randomized intervals. The antennas receive and process the response, and determine the presence of the tags by proximity and triangulation. The distance of a tag from an antenna is calculated by measuring the round trip signal time. The cell controllers send data from the antenna to a host computer. The host computer collects the data and resolves them into positional estimates. The data are archived in a data warehouse, such as an SQL Server.

Japanese Patent Application Publication JP 2000-20651-A published on Jan. 21, 2000 describes a reader/writer. The reader/writer is equipped with a synthesizer having a carrier wave generating means that can change the frequency of a generated carrier, has a modulator for modulating the carrier generated by the synthesizer, and communicates an RF signal carrying information with an ID tag by transmitting the RF modulated carrier via a transmission amplifier or a circulator from an antenna. The synthesizer includes, for example, an oscillator for generating a carrier at a variable frequency, an adjustment means for changing an oscillation frequency of the oscillator in response to the input from the outside by controlling the oscillator via a loop filter, and a crystal oscillator for supplying a signal at a predetermined frequency to the adjustment means. This prevents carrier interference between the reader/writers.

Japanese Patent Application Publication JP 2000-187711-A published on Jul. 4, 2000 describes a reader/writer device. The reader/writer device transmits an anti-collision command, receives data from a tag in each time slot, and allocates simple ID numbers ID1-ID4 to respective unique ID codes AAAA, BBBB, CCCC and DDDD of the tags. Only these simple ID codes ID1-ID4 are transmitted to the host device as normal responses. The host device obtains the simple ID numbers, and issues read or write communication commands. This reduces the time and amount of communication with the host device.

SUMMARY OF THE INVENTION

In accordance with an aspect of the present invention, an information access system for accessing information stored in a contactless information storage device, comprises: an active contactless information storage device having a memory, a first control unit, a battery, a timer for measuring time, a receiver unit for sensing carriers of RF signals at first and second different frequencies for detection, and a transmitter unit for transmitting a response signal at a third or fourth frequency different from the first and second frequencies in response to reception of an ID request signal; a first reader/writer device connected to an information processing apparatus, and having a second control unit, a second transmitter unit for cyclically transmitting an ID request signal at the first frequency under the control of the second control unit, and a second receiver unit adapted to be continuously ready to receive an RF signal at the third frequency; and a second reader/writer device connected to an information processing apparatus, and having a third control unit, a third transmitter unit for cyclically transmitting an ID request signal at the second frequency under the control of the third control unit, and a third receiver unit adapted to be continuously ready to receive an RF signal at the fourth frequency. The first control unit controls the first receiver unit to sense a carrier of an RF signal at the first frequency in first predetermined periods occurring in a predetermined cycle and sense a carrier of an RF signal at the second frequency in second predetermined periods occurring in the predetermined cycle. When the first receiver unit senses and detects a carrier of an RF signal at one of the first and second frequencies in a particular predetermined period, the first control unit causes the first receiver unit to receive further the ID request signal, and, in response to the ID request signal, causes the first transmitter unit to transmit a response signal at a corresponding one of the third and fourth frequencies that carries an ID of the active contactless information storage device stored in the memory. In the carrier sensing, the first control unit causes the first receiver unit to be in an active state and the transmitter unit to be in an inactive state in the first and second predetermined periods. When the first receiver unit attempts to sense a carrier of an RF signal at the first frequency in the first predetermined period but detects no carrier, the first control unit controls the first receiver unit and the first transmitter unit to maintain the inactive state during a non-carrier sensing period between the first predetermined period for carrier sensing and the second predetermined period for subsequent carrier sensing.

In accordance with another aspect of the invention, an information access system for accessing information stored in a contactless information storage device, comprises: an active contactless information storage device having a memory, a first control unit, a battery, a timer for measuring time, first and second receiver units for sensing carriers of RF signals at first and second different frequencies for detection, and first and second transmitter units for transmitting respective response signals at third and fourth frequencies different from the first and second frequencies in response to reception of ID request signals; a first reader/writer device connected to an information processing apparatus, and having a second control unit, a third transmitter unit for cyclically transmitting an ID request signal at the first frequency under the control of the second control unit, and a third receiver unit adapted to be continuously ready to receive an RF signal at the third frequency; and a second reader/writer device connected to an information processing apparatus, and having a third control unit, a fourth transmitter unit for cyclically transmitting an ID request signal at the second frequency under the control of the third control unit, and a fourth receiver unit adapted to be continuously ready to receive an RF signal at the fourth frequency. The first control unit controls the first and second receiver units to simultaneously sense carriers of RF signals at the first and second frequencies in predetermined periods occurring in a predetermined cycle. When the first receiver unit senses and detects a carrier of an RF signal at the first frequency in a particular predetermined period, the first control unit causes the first receiver unit to receive further the ID request signal, and, in response to the ID request signal, causes the first transmitter unit to transmit a response signal at the third frequency corresponding to the first frequency that carries an ID of the active contactless information storage device stored in the memory. When the second receiver unit senses and detects a carrier of an RF signal at the second frequency in the particular predetermined period, the first control unit causes the second receiver unit to receive further the ID request signal, and, in response to the ID request signal, causes the second transmitter unit to transmit a response signal at the fourth frequency corresponding to the second frequency that carries an ID of the active contactless information storage device stored in the memory. In the carrier sensing, the first control unit causes the first and second receiver units to be in an active state and the first and second transmitter units to be in an inactive state in the particular predetermined period and a subsequent predetermined period. When the first receiver unit attempts to sense a carrier of an RF signal at the first frequency in the particular predetermined period but detects no carrier, the first control unit controls the first receiver unit and the first transmitter unit to maintain the inactive state during a non-carrier sensing period between the particular predetermined period for carrier sensing and the subsequent predetermined period for subsequent carrier sensing. When the second receiver unit attempts to sense a carrier of an RF signal at the second frequency in the particular predetermined period but detects no carrier, the first control unit controls the second receiver unit and the second transmitter unit to maintain the inactive state during a non-carrier sensing period between the particular predetermined period for carrier sensing and the subsequent predetermined period for subsequent carrier sensing.

The invention also relates to an active contactless information storage device for use in the information access system described above.

BRIEF DESCRIPTION OF THE DRAWINGS

FIG. 14 shows an example of a response list stored in the memory;

FIG. 16 shows the configuration of another active RF ID tag in accordance with another embodiment of the invention;

FIGS. 17A to 17F show respective time charts of the receive ready states and of processing for reception of respective received RF signals at respective frequencies in the reader/writer devices, and FIGS. 17G-17I show respective time charts of carrier sensing, processing for reception of received RF signals, and processing for transmission of RF signals carrying responses in the case of successful authentication in the ID tag units of the active RF ID tag;

FIG. 20 shows an example of a condition list stored in the memory of the RF ID tag of FIG. 16 or in the memory of the RF ID tag of FIG. 12;

DESCRIPTION OF THE PREFERRED EMBODIMENTS

The known improved active-type RF ID tag that responds only to a tag ID request carried by an RF signal transmitted by a reader/writer device requires a receiving circuit, and hence has a larger circuit size and a significantly higher power consumption than the active-type RF ID tag capable solely of transmission.

The inventors have recognized that a reader/writer device, which is adapted to cyclically transmit an RF signal to an RF ID tag at a particular frequency and at sufficiently short intervals and be continuously ready to receive an RF signal from the RF ID tag at a different frequency, will significantly reduce the power consumption of the RF ID tag, so that the battery run time of the RF ID tag can be extended. The inventors have also recognized that a plurality of reader/writer devices may have respective different transmitting and receiving frequencies and an RF ID tag may change its receiving frequencies cyclically, in order to prevent interference between tag ID requests carried by RF signals transmitted by the plurality of reader/writer devices.

An object of the present invention is to reduce possible interference between reader/writer devices.

Another object of the invention is to provide an active contactless information storage device which transmits a response signal only to a predetermined reader/writer device.

According to the invention, possible interference between reader/writer devices can be reduced, and an active contactless information storage device can transmit a response signal only to a predetermined reader/writer device.

Figure 1:
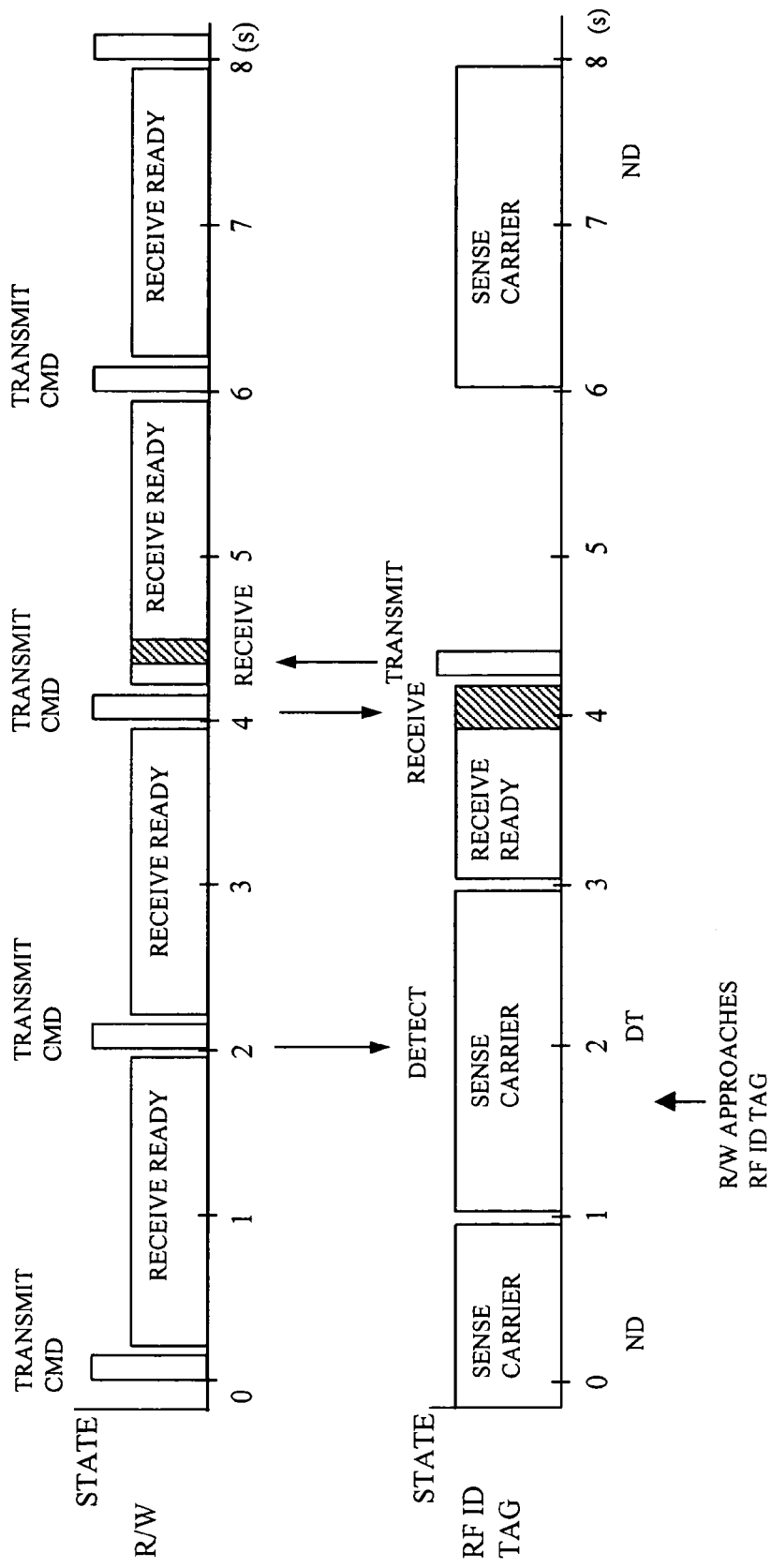
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of two (2) seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device at a random timing in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two seconds as an example, the carrier sensing duration also requires to have about two or more seconds in order to ensure the detection.

In general, when the RF ID tag receives no request from the reader/writer device, the RF ID tag is required to enter into a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

Figure 2:
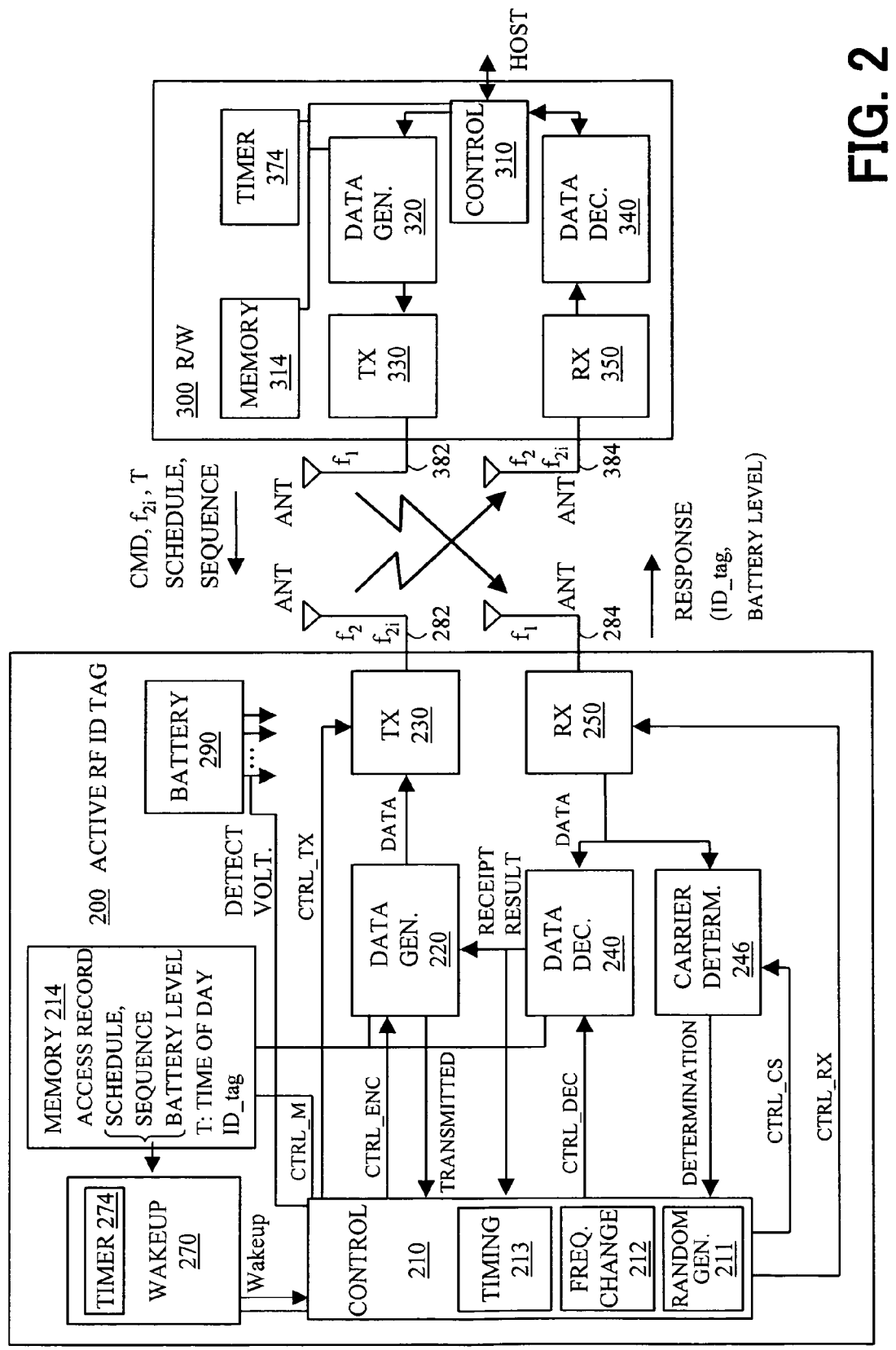
FIG. 2 shows the configurations of a further improved active-type RF ID tag as an active contactless information storage device and of a reader/writer device.

FIG. 2 shows the configurations of a further improved active-type RF ID tag 200 as an active contactless information storage device and of a reader/writer device 300. As an active contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, ..., n); a receiver unit (RX) 250 for receiving and demodulating an RF signal at a frequency $f_1$, to thereby reproduce baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, ..., 305 MHz, for example. The transmission output power of the transmitter unit (TX) 230 may be 1 mW for example. Alternatively, the antennas 282 and 284 may be composed of a single antenna.

The control unit 210 includes a random number generator 211 for generating a random number for selecting a time slot for transmission, a frequency changing unit 212 for changing the transmitting frequency $f_{2i}$, and a timing unit 213 for adjusting a timing for transmission.

The control unit 210 is always in an active state after power activation, and provides a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program.

The memory 214 stores information such as, the tag ID (ID_tag) of the RF ID tag 200, the current time-of-day information T, records of accesses performed by the reader/writer device 300, a control schedule and a time control sequence of the wakeup unit 270, the current remaining power level of the battery 290, a cycle of sensing a carrier, a time period of processing for reception, a cycle of transmission, and a time period of transmission. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is always in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle for sensing a carrier, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data in a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data in a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at, a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband encoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID request command from the host computer, it provides data containing the command to the data generation unit 320. The data may contain: the transmission frequency $f_2$ or $f_{2i}$ to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated.

Figure 3:
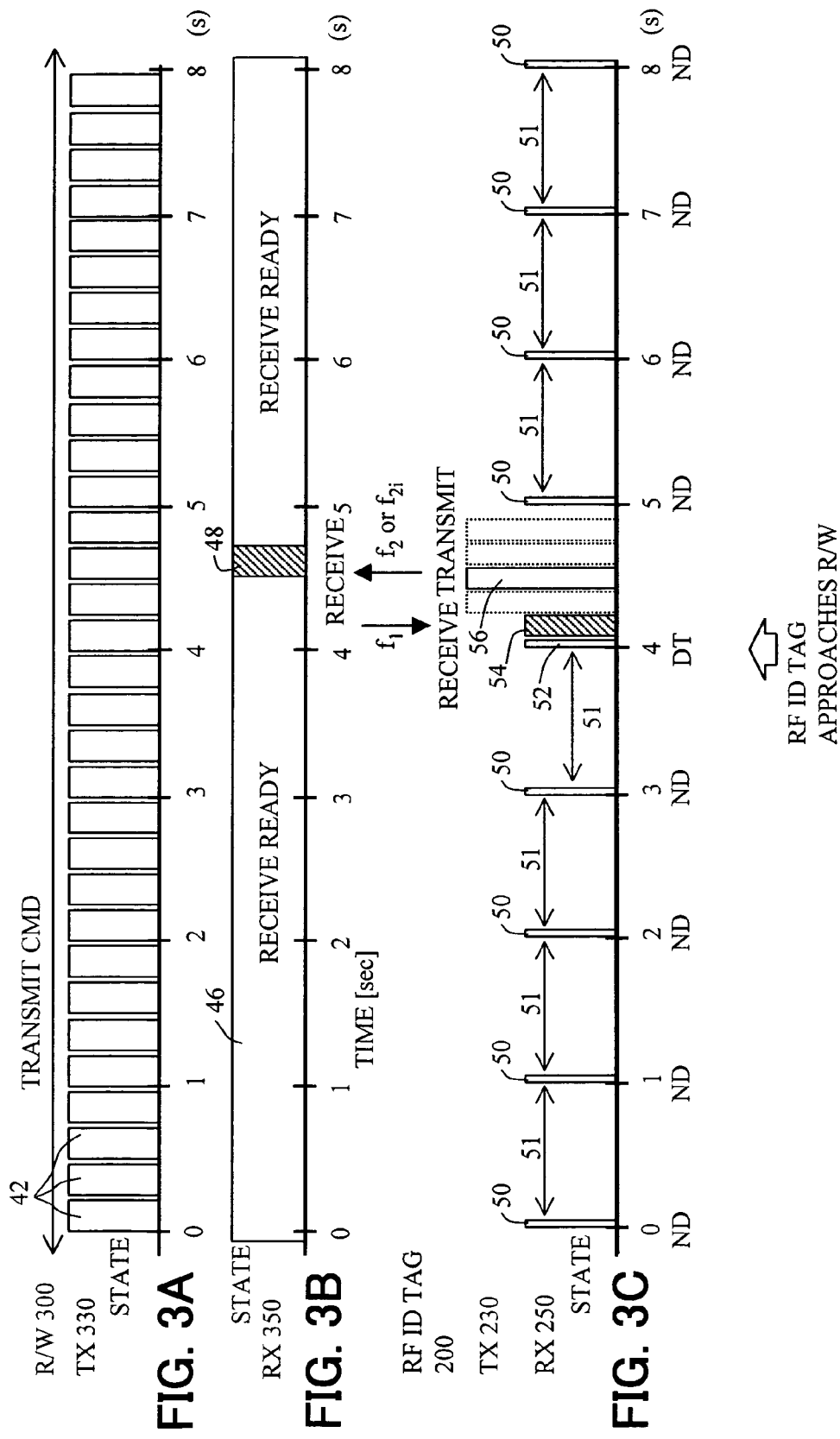
FIG. 3A shows a time chart of processing for transmission of an RF signal carrying a command transmitted from the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle, for example of 2 seconds. This causes the receiver unit 250 to enter into a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters into a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal to thereby reproduce encoded data containing a command. The enabled data decoding unit 240 decodes the data in accordance with the predetermined encoding scheme, then obtains the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) retrieved from the memory 214, and then encodes the data in accordance with the predetermined encoding scheme. The enabled transmitter unit 230 modulates the carrier with the response data containing the tag ID, and then transmits the RF signal.

Referring to FIG. 3B, the receiver unit 350 of the reader/writer device 300 is always in the receive ready state 46. When the RF ID tag 200 approaches the reader/writer device 300 and the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, the total time during which the RF ID tag 200 is not located near the reader/writer device 300 is significantly long. Thus, the active-type RF ID tag 200 is in a sleep mode of operation for the most time. This significantly reduces the power consumption of the active-type RF ID tag 200, and hence significantly increases the run time of the battery 290.

Figure 4:
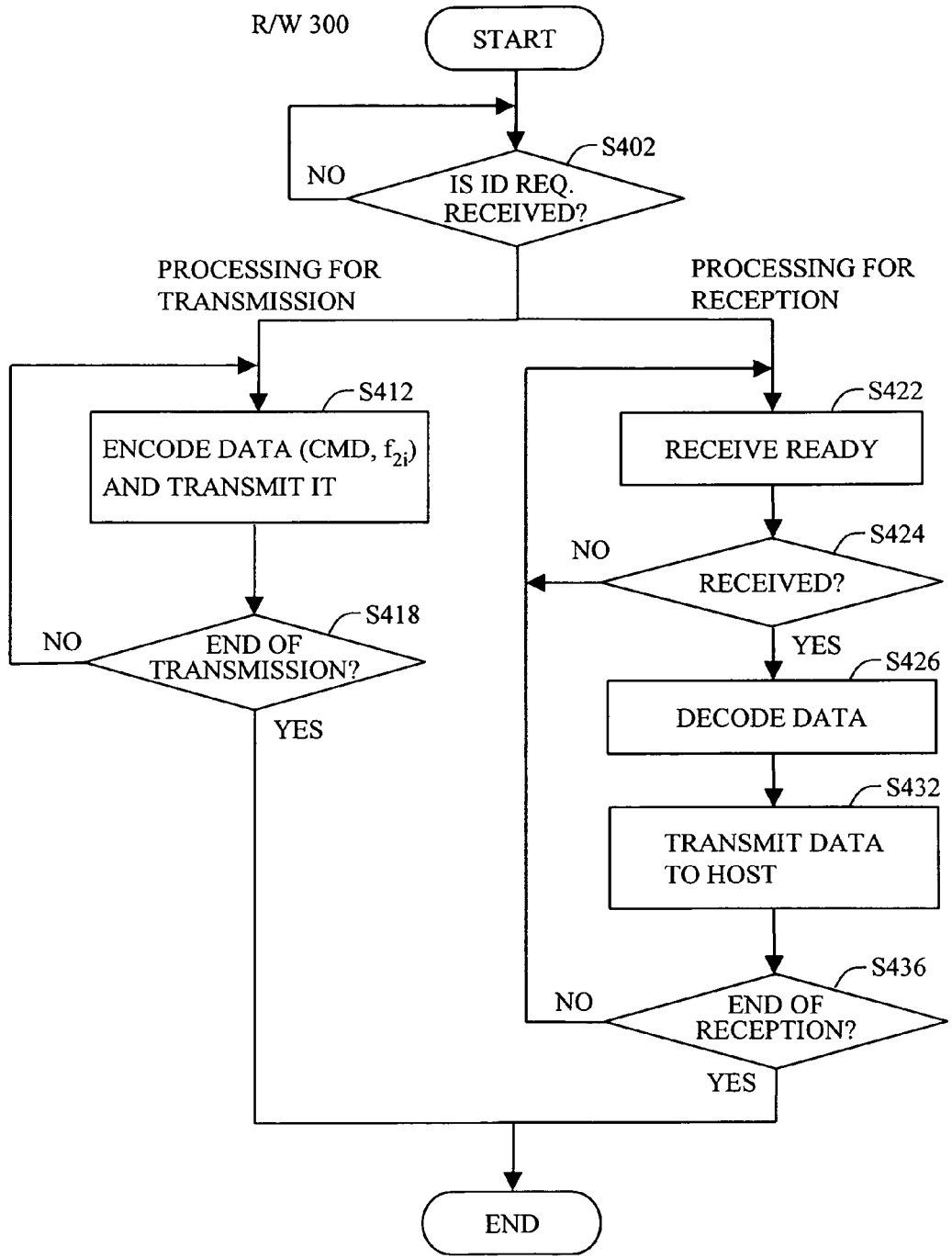
FIG. 4 shows a flow chart for the processing performed by the reader/writer device.
Figure 5A:
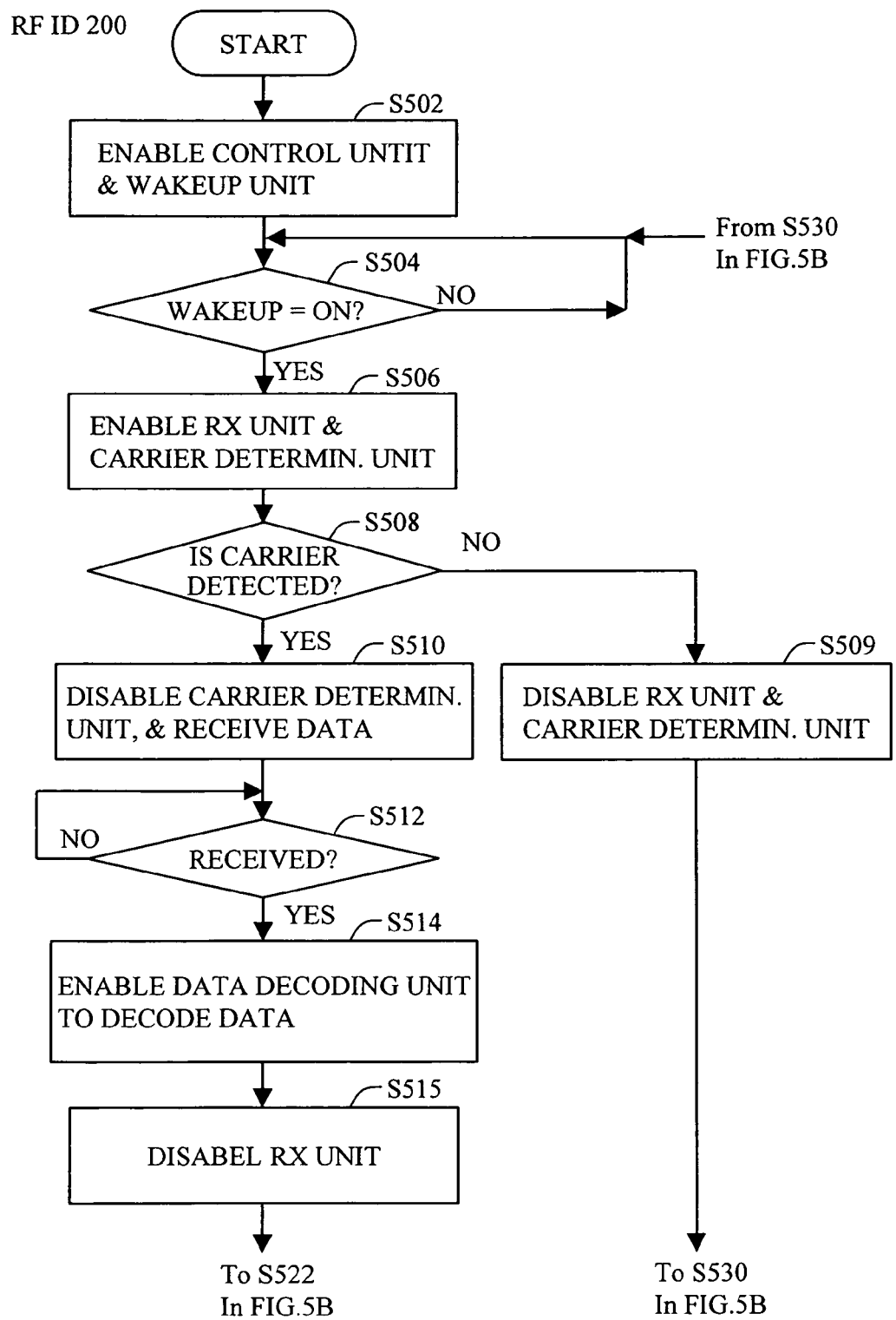
FIGS. 5A and 5B show a flow chart for the processing performed by the active-type RF ID tag.
Figure 5B:
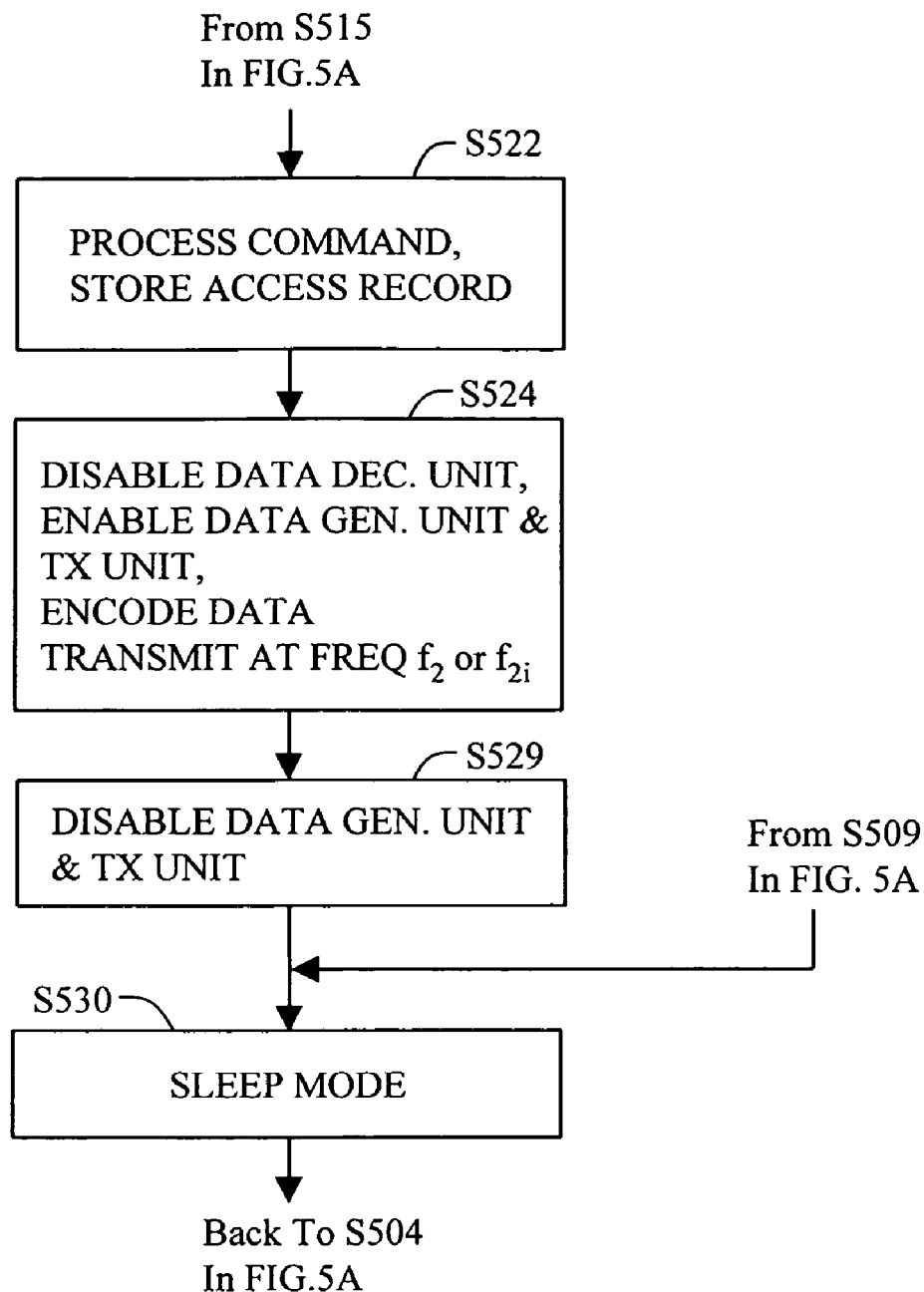

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the ID request command and the related information to the data generation unit 320. The data generation unit 320 generates data containing the ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the ID request command, data for specifying the transmission frequency $f_2$ or the variable transmission frequencies $f_{2i}$ used for a response to the ID request command; data indicative of time of day or time slots to be used for the variable transmission frequencies $f_{2i}$; data indicative of the current time of day T; and a control schedule and a time control sequence.

The reader/writer device 300 may change the frequencies $f_{2i}$ in the order in a time division manner, selecting one of the frequencies for every set of commands in respective transmission cycles $t_{RW-CY}$, the number of which corresponds to the time length of one or more cycles of sensing a carrier. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are always enabled, and hence in an active state. In accordance with the timer 274 and with the time control sequence, the wakeup unit 270 provides the control unit 210 with a wakeup signal indicative of the timing for carrier sensing of a received RF signal in a predetermined cycle. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). Such a random number is generated by the random number generator unit 211. This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{2i}$. The frequency $f_{2i}$ is changed by the frequency changing unit 212 of the control unit 210. The timing unit 213 adjusts a plurality of successive cycle time slots to occur in a predetermined cycle.

At Step 529, the control unit 210 disables the data generation unit 220 and the transmitter unit 230. At Step 530, the control unit 210 causes the RF ID tag 200 to enter into the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter into the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme to thereby reproduce the response data, and then provides notification of the data reception and the response data to the control unit 310.

At Step 432, the control unit 310 transmits the decoded data to the host computer. At Step 436, the control unit 310 determines whether the data receive ready state is to be terminated. If it is determined that the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs transmission cyclically at sufficiently short intervals, and is always in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of 1 second), while, when the remaining battery power level goes below a threshold, carrier sensing may be performed in a relatively long cycle (e.g., of 2 seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
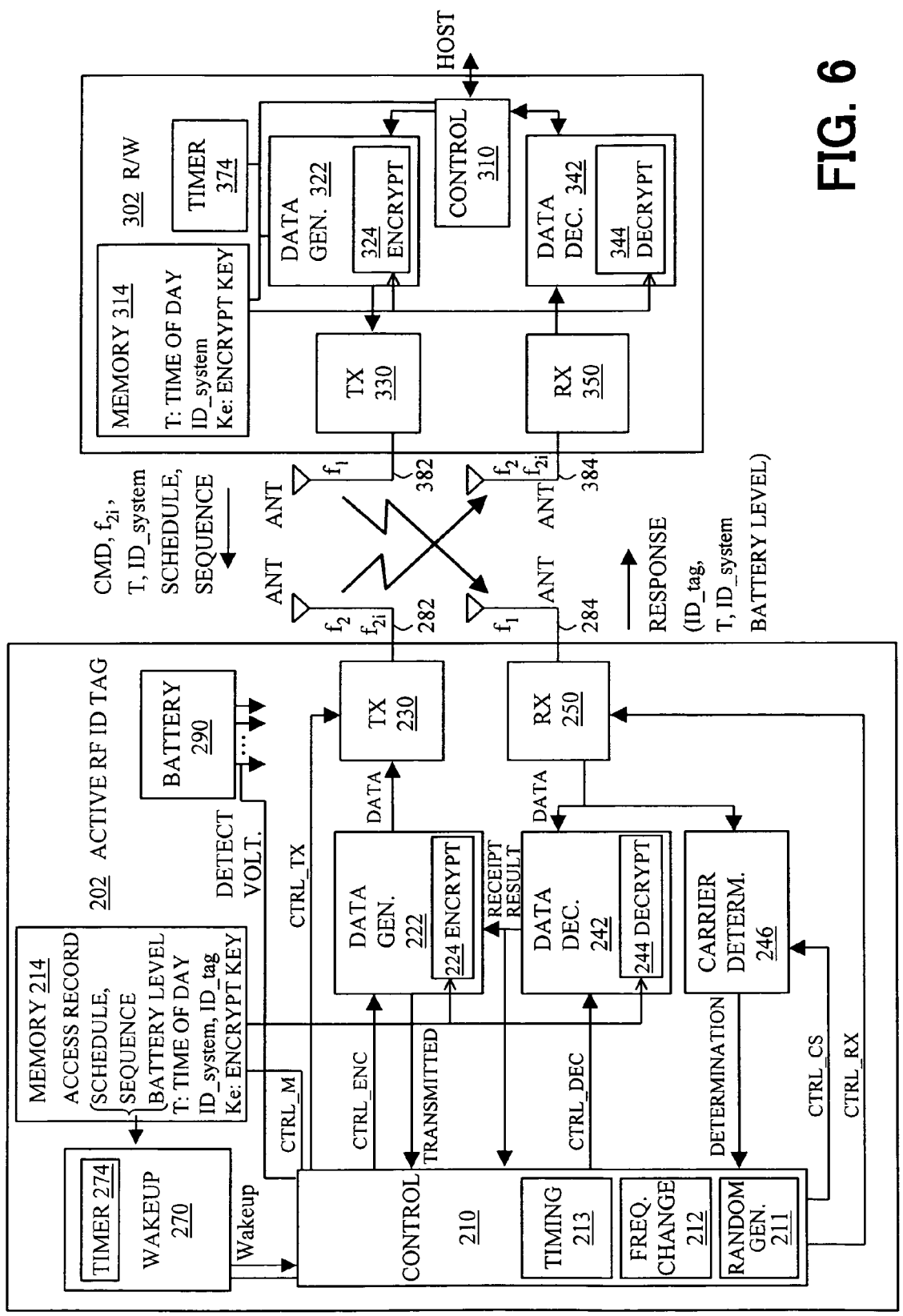
FIG. 6 shows modification of the configurations of FIG. 2, and illustrates the configurations of a more secure active-type RF ID tag and of a reader/writer device.

FIG. 6 shows modification of the configurations of FIG. 2, and illustrates the configurations of a more secure active-type RF ID tag 202 and of a reader/writer device 302. In these configurations, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem herein. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 324 includes an encryption unit 322 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figure 7:
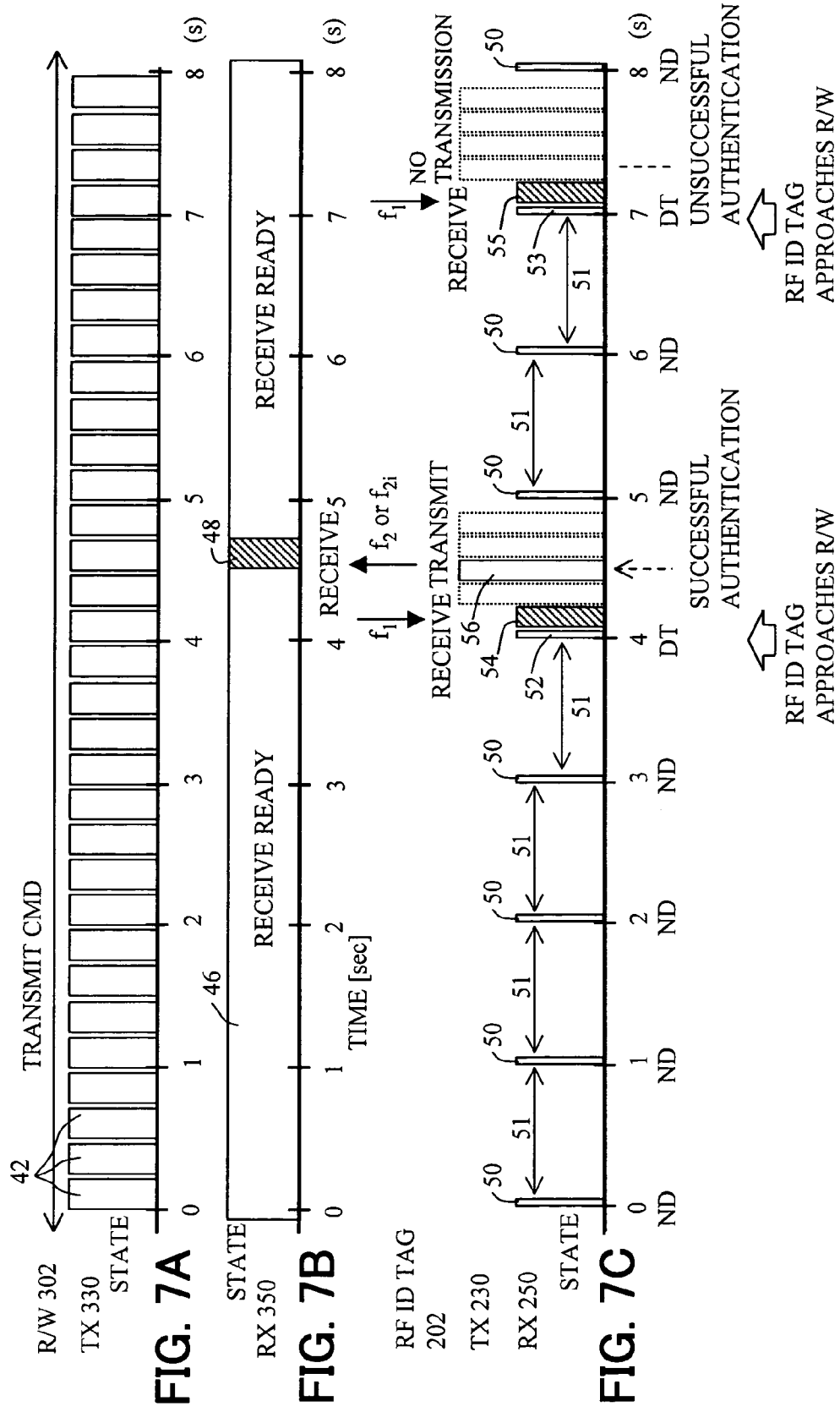
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying an ID request command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50, 52 and 53, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, and encodes the data in accordance with the predetermined encoding scheme to thereby generate encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50, 52 and 53 with the predetermined duration occurring in the fixed cycle, so that the enabled receiver unit 250 enters into a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby reproduce encoded encrypted data containing the command. The enabled data decoding unit 242 decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is always in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
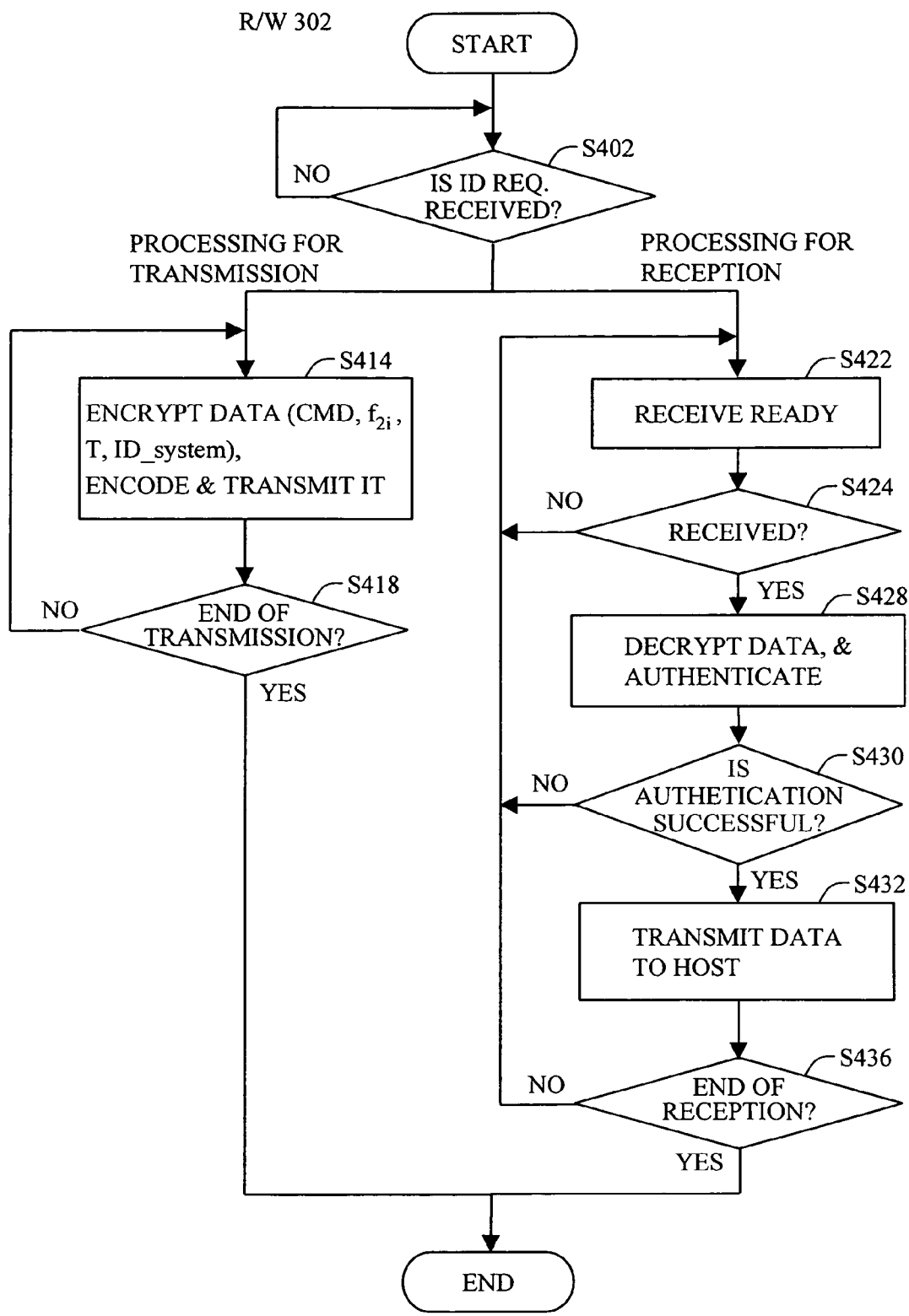
FIG. 8 shows a flow chart for the processing performed by the reader/writer device.
Figure 9A:
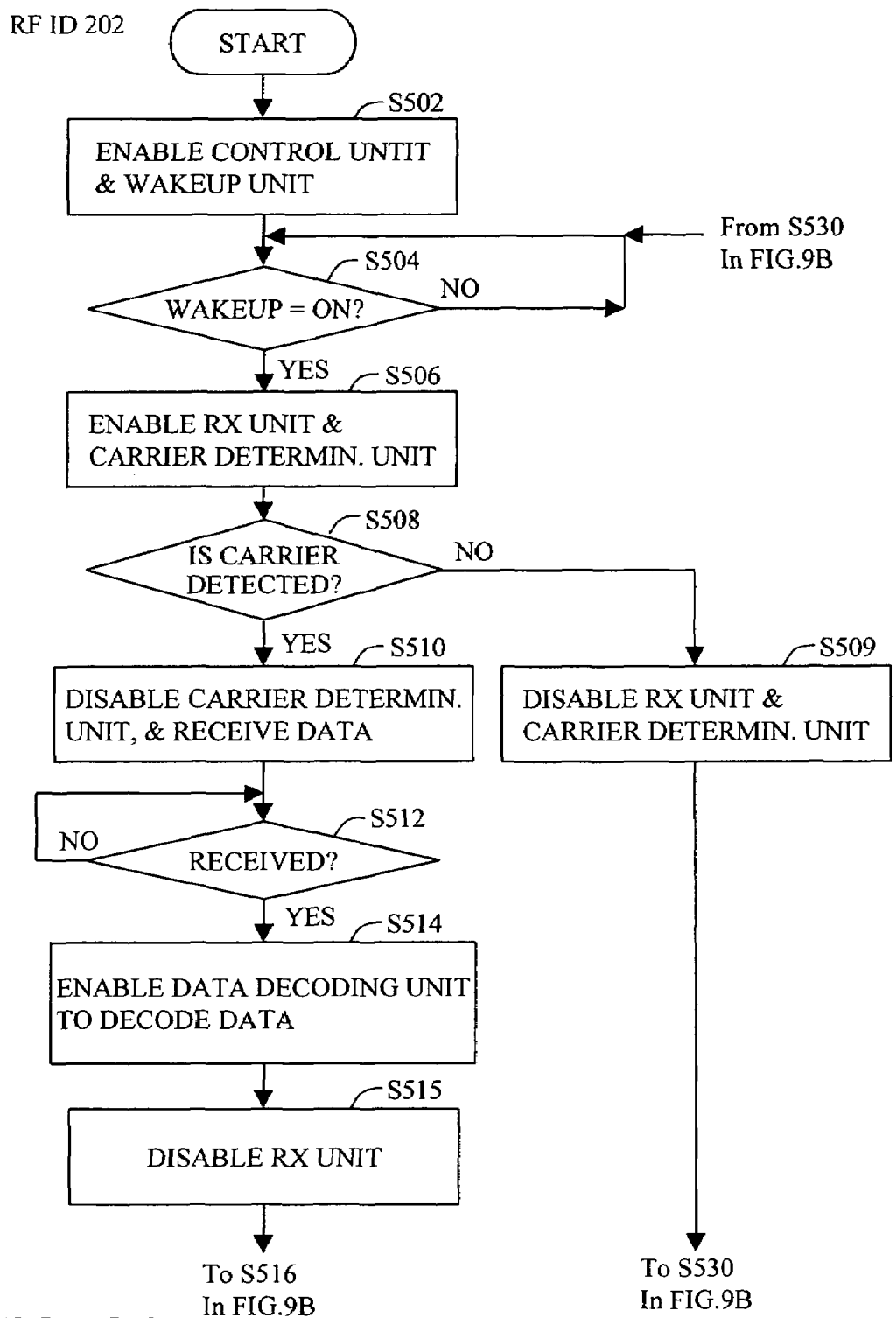
FIGS. 9A and 9B show a flow chart for the processing performed by the active-type RF ID tag.
Figure 9B:
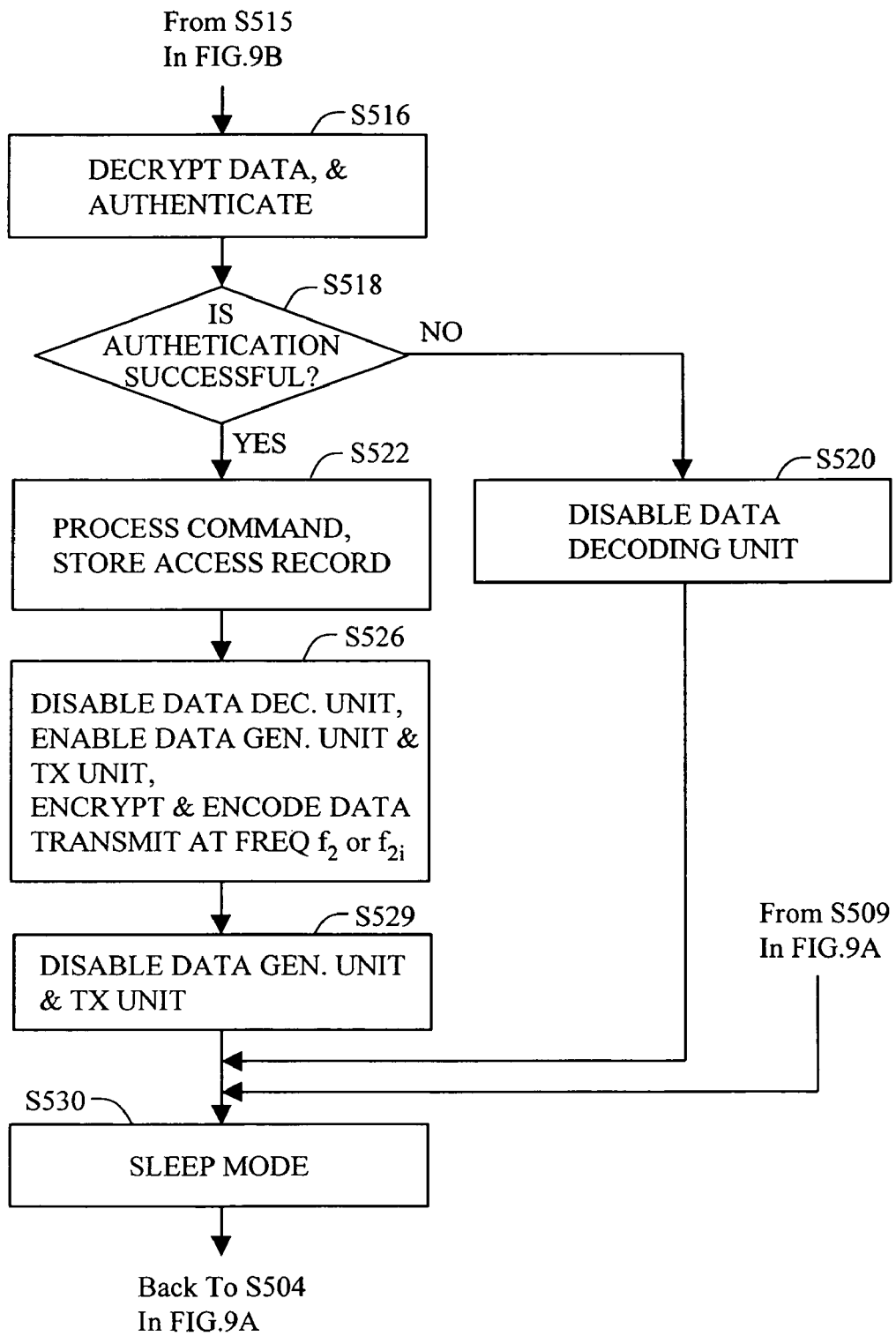

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the ID request command to the data generation unit 322. The data generation unit 322 encrypts data containing the ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data to thereby generate encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the ID request command, then processes the decrypted received command contained in decoded data, and then stores into the memory 214 the record of access from the reader/writer device 302.

At Step 526, in accordance with the ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8, Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

Figure 10:
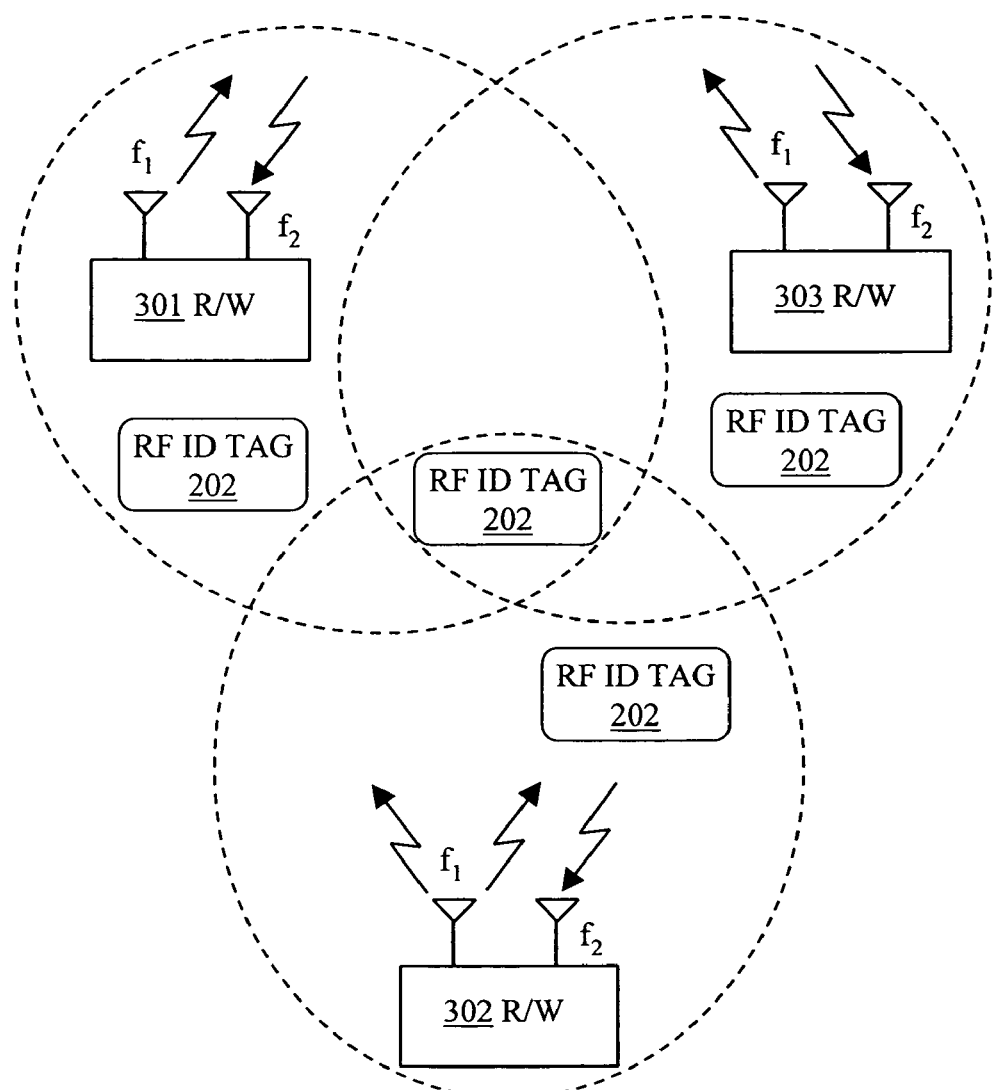
FIG. 10 shows an RF ID tag located in the communication ranges of a plurality of reader/writer devices having the same configuration and disposed at different positions.

FIG. 10 shows an RF ID tag 202 located in any of the communication ranges of a plurality of reader/writer devices 301, 302 and 303 having the same configuration and disposed at different positions. The communication ranges are indicated by closed broken lines. When the RF ID tag 202 is located in the overlapped region of the communication ranges of the reader/writer devices 301, 302 and 303, ID request signals at the same frequency $f_1$ from the reader/writer devices 301, 302 and 303 received by the RF ID tag 202 interfere with each other. Thus, the RF ID tag 202 cannot receive these ID request signals normally, and hence the RF ID tag 202 cannot transmit response signals. Further, if these reader/writer devices 301, 302 and 303 employ the same transmitting and receiving frequencies and the same encryption key, the RF ID tag 202 generates undesirable response signals in response to ID request signals from irrelevant reader/writer devices which the RF ID tag 202 is not required to respond to.

The inventors have recognized that a plurality of reader/writer devices may be adapted to have respective different transmitting and receiving frequencies so as to reduce the possible interference, and that an RF ID tag may be adapted to transmit response signals at respective frequencies associated with respective receiving frequencies of received signals so as to prevent undesirable transmission of response signals.

Figure 11:
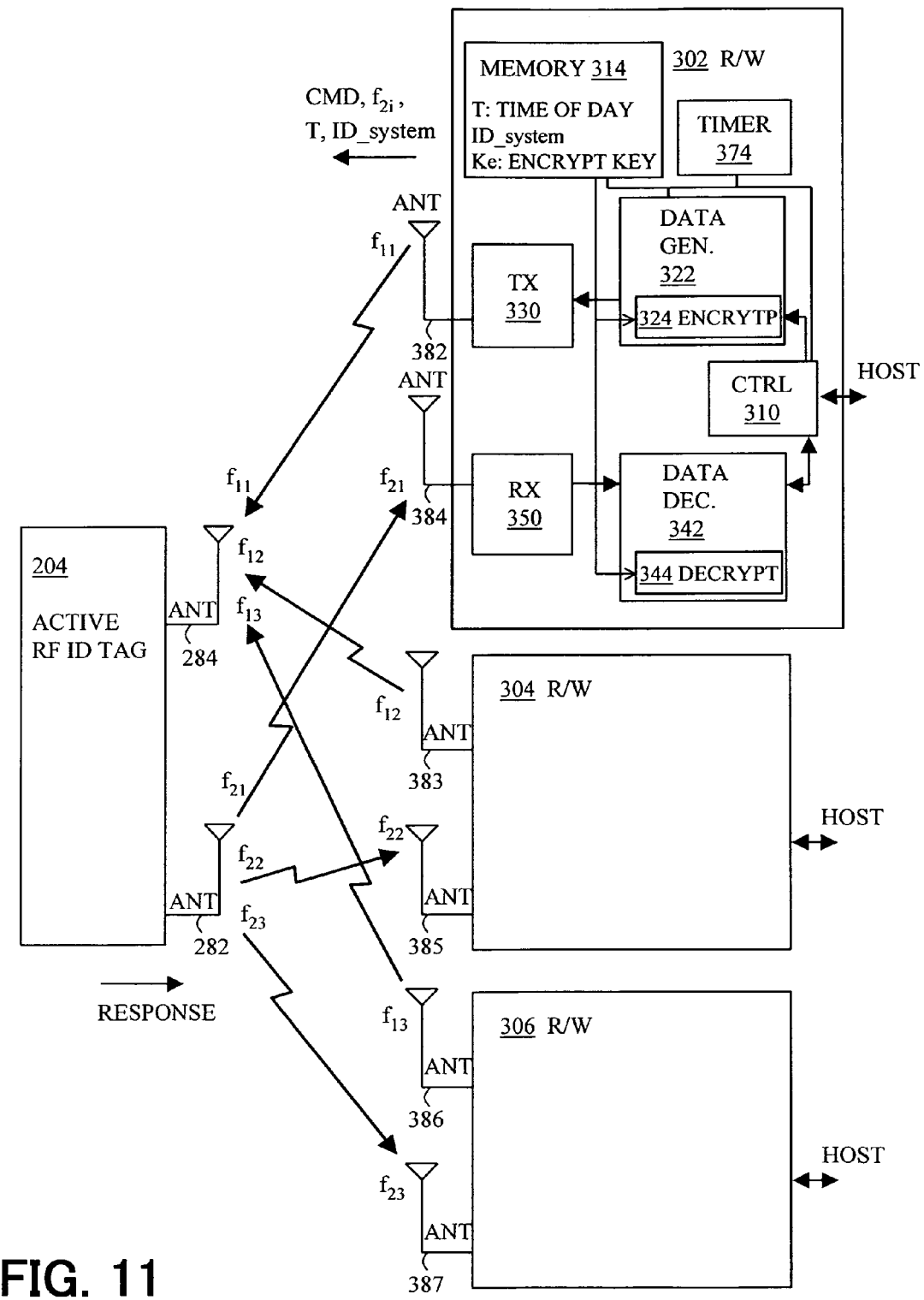
FIG. 11 shows the relation of the frequencies of an active RF ID tag and of a plurality of reader/writer devices, in accordance with an embodiment of the invention.

FIG. 11 shows the relation of the frequencies of an active RF ID tag 204 and of a plurality of reader/writer devices 302, 304 and 306, in accordance with an embodiment of the invention. The reader/writer devices 304 and 306 have the same configuration as the reader/writer device 302. However, the reader/writer devices 302, 304 and 306 transmit respective ID request signals at respective different frequencies $f_{11}$, $f_{12}$ and $f_{13}$, and receive respective response signals at respective different frequencies $f_{21}$, $f_{22}$ and $f_{23}$. The RF ID tag 204 is adapted to receive the ID request signals at the respective frequencies $f_{11}$, $f_{12}$ and $f_{13}$ cyclically in a time division manner, and to transmit response signals at the respective frequencies $f_{21}$, $f_{22}$ and $f_{23}$ associated with the respective receiving frequencies. The reader/writer devices 302, 304 and 306 have respective different system IDs. In this case, the reader/writer devices 302, 304 and 306 need not be in synchronization with each other for transmission. The reader/writer devices 302, 304 and 306 may be connected to respective different host computers, or may be connected to a single host computer.

Figure 12:
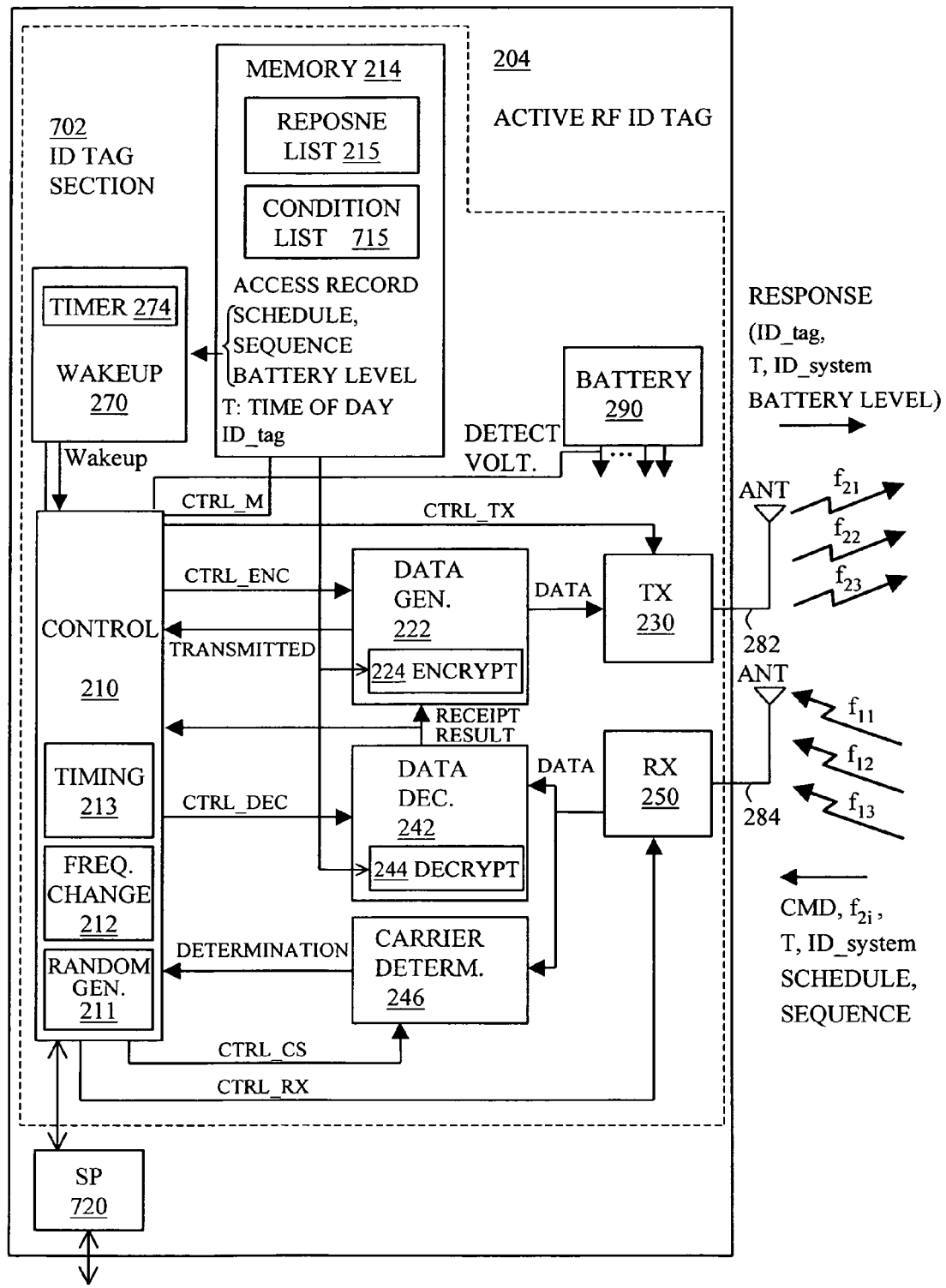
FIG. 12 shows the configuration of the active RF ID tag in accordance with the embodiment of the invention.

FIG. 12 shows the configuration of the active RF ID tag 204 in accordance with the embodiment of the invention. In the RF ID tag 204, the frequency changing unit 212 cyclically changes the receiving frequency of the receiver unit 250, and allows the receiver unit 250 to receive ID request signals at a plurality of receiving frequencies $f_{11}$, $f_{12}$ and $f_{13}$ in a time division manner. Then, in relation to these respective receiving frequencies, the frequency changing unit 212 cyclically changes the transmitting frequency of the transmitter unit 230, and causes the transmitter unit 230 to transmit response signals at a plurality of transmitting frequencies $f_{21}$, $f_{22}$ and $f_{23}$ in a time division manner. The timer 274 of the wakeup unit 270 measures time in a predetermined short cycle and also in a predetermined long cycle. Then, the wakeup unit 270 generates, in the predetermined long cycle of, for example, nine (9) seconds, a set of a predetermined number of wakeup signals occurring in the predetermined short cycle of, for example of, one (1) second. The predetermined number of wakeup signals may be a multiple of the number (e.g., three) of different employed receiving frequencies ($f_{11}$, $f_{12}$, $f_{13}$). The memory 214 stores a response list 215 and possibly a condition list 715. The response list 215 contains the relation between the receiving frequency and encryption/decryption key Ke of a tag ID request signal and the transmitting frequency and encryption key Ke of a response signal, for each system ID. The transmitting encryption key may be the same as the receiving encryption/decryption key for each system ID. Any one of the encryption/decryption keys Ke of the respective system IDs is preferably different from the others. However, these keys may be the same. The RF ID tag 204 has a serial port 720 for external communication with a further device. The other elements of the RF ID tag 204 are essentially the same as those of the RF ID tag 202 of FIG. 6. Any one of the frequencies $f_{21}$, $f_{22}$ and $f_{23}$ is preferably different from the others. However, these frequencies may be the same.

Figure 13:
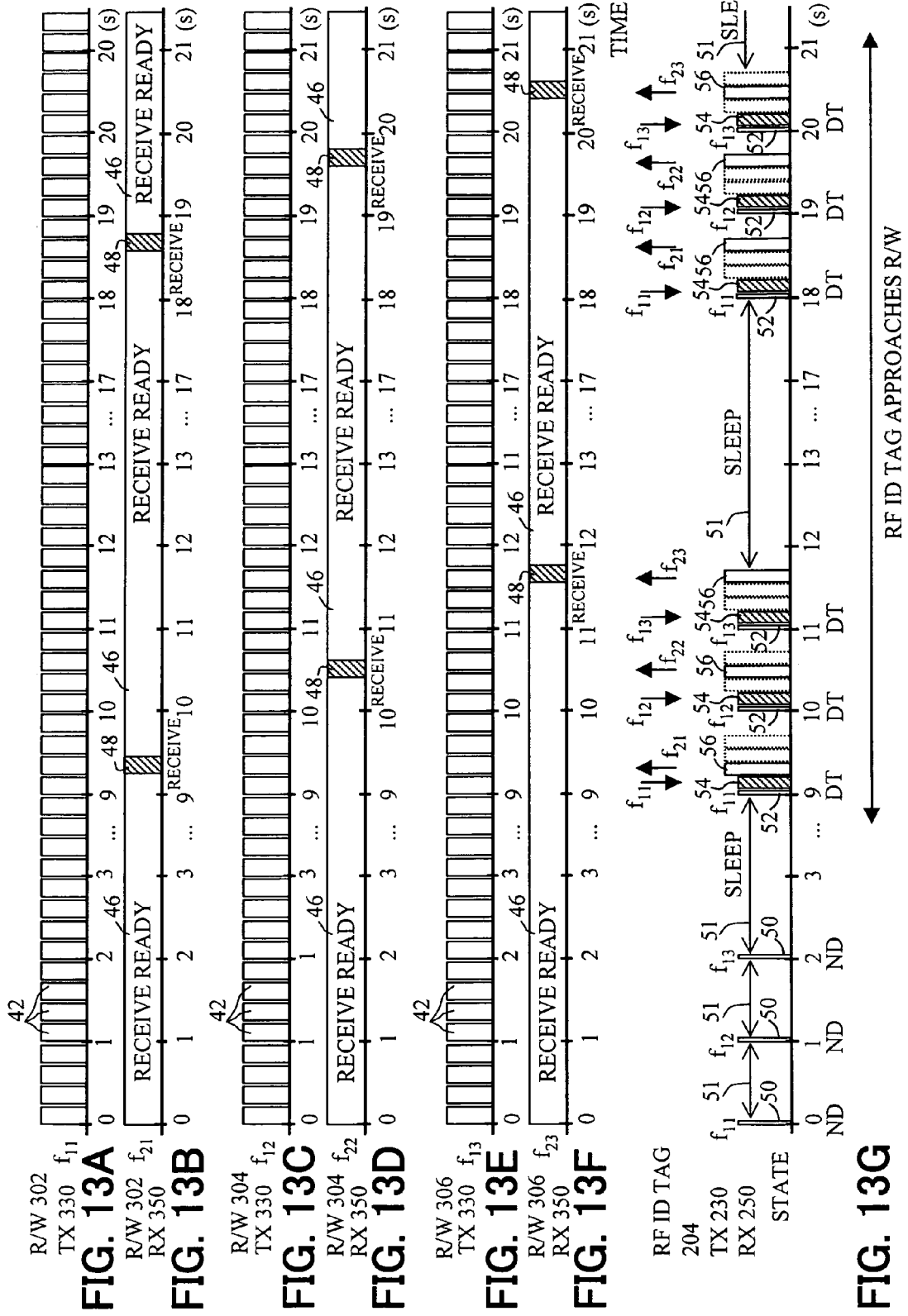
FIGS. 13A, 13C and 13E show respective time charts of processing for transmission of RF signals at frequencies that carry ID request commands transmitted from the reader/writer devices.
FIGS. 13B, 13D and 13F show respective time charts of receive ready states and of processing for reception of respective received RF signals at respective frequencies in the reader/writer devices.
FIG. 13G shows a time chart of carrier sensing, processing for reception of received RF signals, and processing for transmission of RF signals carrying respective responses in the case of successful authentication, in the active RF ID tag.

FIGS. 13A, 13C and 13E show respective time charts of processing for transmission 42 of RF signals at frequencies $f_{11}$, $f_{12}$ and $f_{13}$ that carry ID request commands (CMDs) transmitted from the reader/writer devices 302, 304 and 306. FIGS. 13B, 13D and 13F show respective time charts of receive ready states 46 and of processing for reception 48 of respective received RF signals at respective frequencies $f_{21}$, $f_{22}$ and $f_{23}$ in the reader/writer devices 302, 304 and 306. FIG. 13G shows a time chart of carrier sensing 50 and 52, processing for reception 54 of received RF signals, and processing for transmission 56 of RF signals carrying respective responses in the case of successful authentication, in the active RF ID tag 204.

FIG. 14 shows an example of the response list 215 stored in the memory 214. The response list 215 contains, for each list number, a list number, a system ID, an associated receiving frequency for an ID request signal, an associated encryption/decryption key for the ID request signal, an associated transmitting frequency for a response signal, an associated encryption key for a response signal, an effective period of these items for that system ID, and an ON/OFF state (i.e., active/inactive state) of reception and response operation based on these items. The system IDs may be unique IDs of the reader/writer devices 302, 304 and 306.

Referring to FIGS. 13A, 13C and 13E, similarly to FIG. 7A, the data generation unit 322 of each of the reader/writer devices 302, 304 and 306 generates data containing a tag ID request command for an RF ID tag that is received from the control unit 310, then encrypts the data and encodes the encrypted data in accordance with the predetermined encoding scheme, to thereby generate encoded encrypted data. In addition to the system ID, the data may further contain a unique ID of a corresponding one of the reader/writer devices 302, 304 and 306. In each time slot of the continual transmission processing 42, the transmitter unit 330 transmits the RF signal carrying the command, cyclically at sufficiently short intervals.

Referring to FIG. 13G, in the active RF ID tag 204, in response to wakeup signals from the wakeup unit 270, the receiver unit 250 and the carrier determination unit 246 are enabled by the control unit 210 in the predetermined number of periods for carrier sensing 50 and 52 with the predetermined duration, such as approximately 1-10 ms, occurring in the short cycle of, for example, 1 second, during the fixed long cycle of, for example, 9 seconds. The set of predetermined number of periods for carrier sensing 50 and 52 occurs in the fixed long cycle. The number of the predetermined number is a multiple of the number (e.g., three) of different employed receiving frequencies ($f_{11}$, $f_{12}$, $f_{13}$). Thus, the receiver unit 250 looks into the response list 215, and thereby goes into a receive ready state at the receiving frequencies $f_1$, $f_{12}$ and $f_{13}$ in this order. Then, in accordance with data indicative of the power intensity of the received RF signal carrier received from the receiver unit 250, the carrier determination unit 246 determines the presence or absence of a received carrier. When the RF ID tag 204 is not near the reader/writer device 302, the determination unit 246 detects no carrier (ND), and hence determines the absence of a carrier. In this case, in a period of time 51 after the carrier sensing period 50, the RF ID tag 204 enters into the sleep mode of operation, during which only the control unit 210 and the wakeup unit 270 are enabled or powered on, while the other elements 214-250 are disabled or powered down. The time length of the sleep period of time 51 may be shorter than the time length of time between the ending time of the carrier sensing duration 50 and the starting time of the next carrier sensing period 50 or 52.

When the RF ID tag 204 enters into the communication ranges of the reader/writer devices 302, 304 and 306 simultaneously so that the receiver unit 250 of the RF ID tag 204 receives, in the periods for carrier sensing 52, RF signals at frequencies $f_{11}$, $f_{12}$ and $f_{13}$ in this order, the carrier determination unit 246 detects the carriers of the RF signals (DT) in the order, and hence determines the presence of carriers.

In response to the resultant determination of the presence of a carrier at the frequency $f_{11}$, similarly to the operation of FIG. 7C, the receiver unit 250 and the data decoding unit 242 are enabled in the time period for the subsequent processing for reception 54 with a predetermined duration, for example, of 100 ms. Then, the enabled receiver unit 250 receives and demodulates the RF signal, to thereby reproduce encoded data containing a command. The data decoding unit 242 looks into the response list 215. When the operation of reception and response for the system ID corresponding to a receiving frequency $f_{1i}$ (e.g., 315.0 MHz) is in an ON state in the response list 215, the data decoding unit 242 retrieves the corresponding encryption/decryption key Ke (e.g., 9B45C83D) from the response list 215 in accordance with the receiving frequency $f_{1i}$, then decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to the command, the control unit 210 authenticates the reader/writer device 304 in accordance with the time-of-day information T and the system ID contained in the command. This authentication may further use the IDs of the reader/writer devices 302, 304 and 306 contained in the request signals. However, when the operation of response for the system ID corresponding to the receiving frequency $f_{1i}$ is in an OFF state in the response list 215, the data decoding unit 242 stops its operation without decoding the data. Thus, the authentication becomes unsuccessful.

Similarly to the operation of FIG. 7C, when the authentication has been successful, the control unit 210, in response to the command, enables the data generation unit 222 and the transmitter unit 230 in a time period or slot of processing for transmission 56 selected at random within a predetermined period of time, each time slot having a predetermined duration, for example, of 100 ms. The enabled data generation unit 222 generates data containing the tag ID (ID_tag) retrieved from the memory 214, and then encrypts the data and encodes the encrypted data in accordance with the predetermined encoding scheme. The enabled transmitter unit 230 modulates the carrier with the response data containing the tag ID, and then transmits the RF signal at the specified transmitting frequency $f_{21}$ (e.g., 316.0 MHz).

Similarly and sequentially, in response to the resultant determinations of the presence of the carriers of RF signals at frequencies $f_{12}$ and $f_{13}$ in the carrier sensing 52, the receiver unit 250 receives and demodulates the RF signals at the frequencies $f_{12}$ and $f_{13}$, and the data decoding unit 242 decodes and decrypts the demodulated data, while the control unit 210 performs authentication. The data generation unit 222 encrypts and encodes the response data, and the transmitter unit 230 transmits response signals at frequencies $f_{22}$ and $f_{23}$.

Referring to FIGS. 13B, 13D and 13F, similarly to the operation of FIG. 7B, the receiver unit 350 of each of the reader/writer devices 302, 304 and 306 is always in the receive ready state 46. When the RF ID tag 204 approaches the reader/writer devices so that each reader/writer device 302, 304 or 306 receives an RF signal at a frequency $f_{21}$, $f_{22}$, or $f_{23}$, in the time period of processing for reception 48, the receiver unit 350 demodulates the received RF signal to thereby reproduce encoded encrypted data. Then, the data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 204 in accordance with the time-of-day information T and the system ID contained in the response. The control unit 310 provides the tag ID to the host computer. The host computer processes the tag ID for use in monitoring and managing the article distribution or the persons.

As described above, the RF ID tag 204 senses, in a time division manner for reception, the carriers of the transmitted signals at respective different transmitting frequencies in the order from the reader/writer devices 302, 304 and 306. This significantly reduces the possible interference of the transmitted signals from the reader/writer devices 302, 304 and 306, and hence prevents response signals from being transmitted to irrelevant reader/writer devices which the RF ID tag 204 is not required to respond to. For example, when the operation of the system in a list number 3 in the response list 215 of FIG. 14 is in an OFF state, or when the items for the system are not set up, the RF ID tag 204 does not respond to the reader/writer device 306.

Figure 15A:
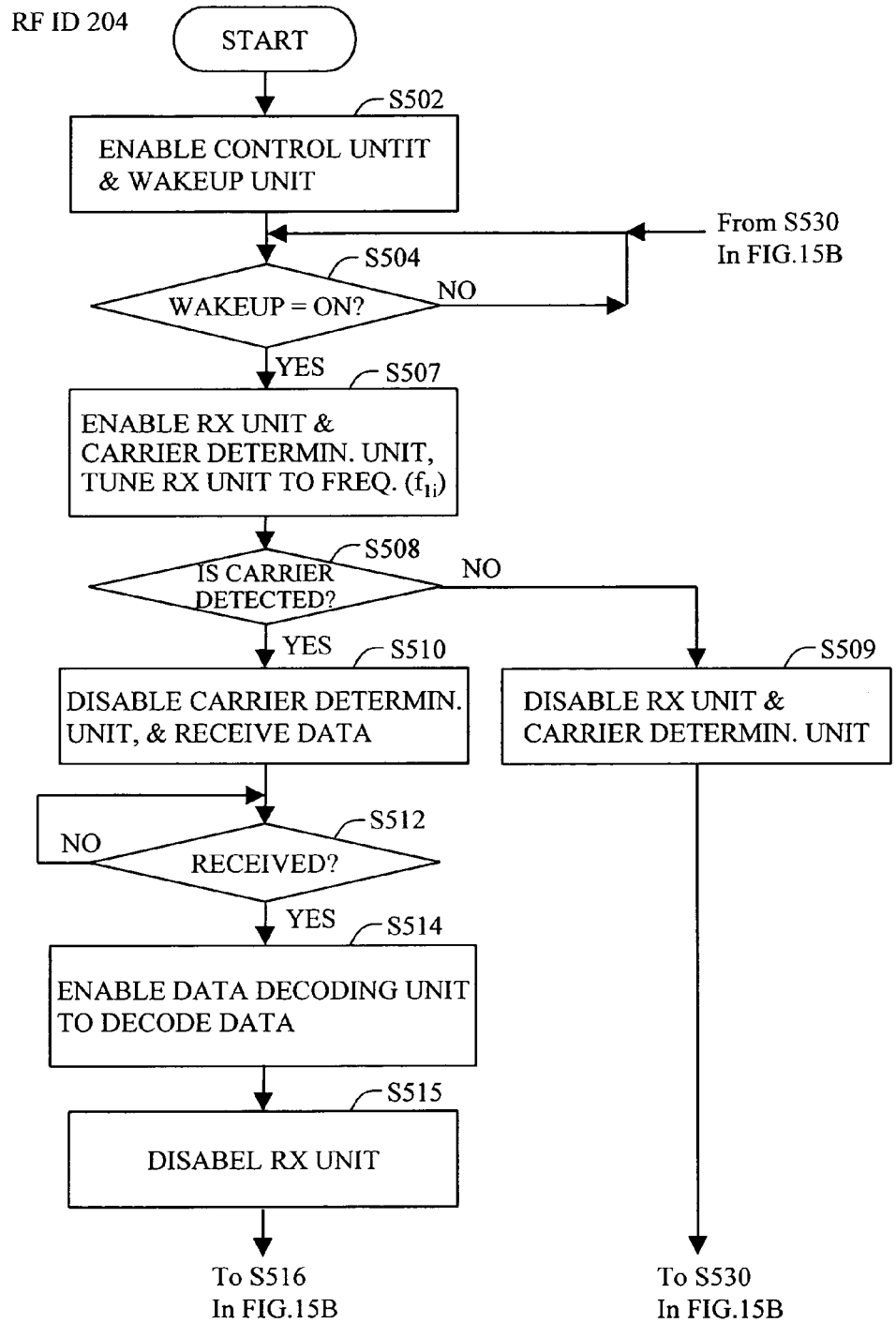
FIGS. 15A and 15B show a flow chart for the processing performed in the active RF ID tag.
Figure 15B:
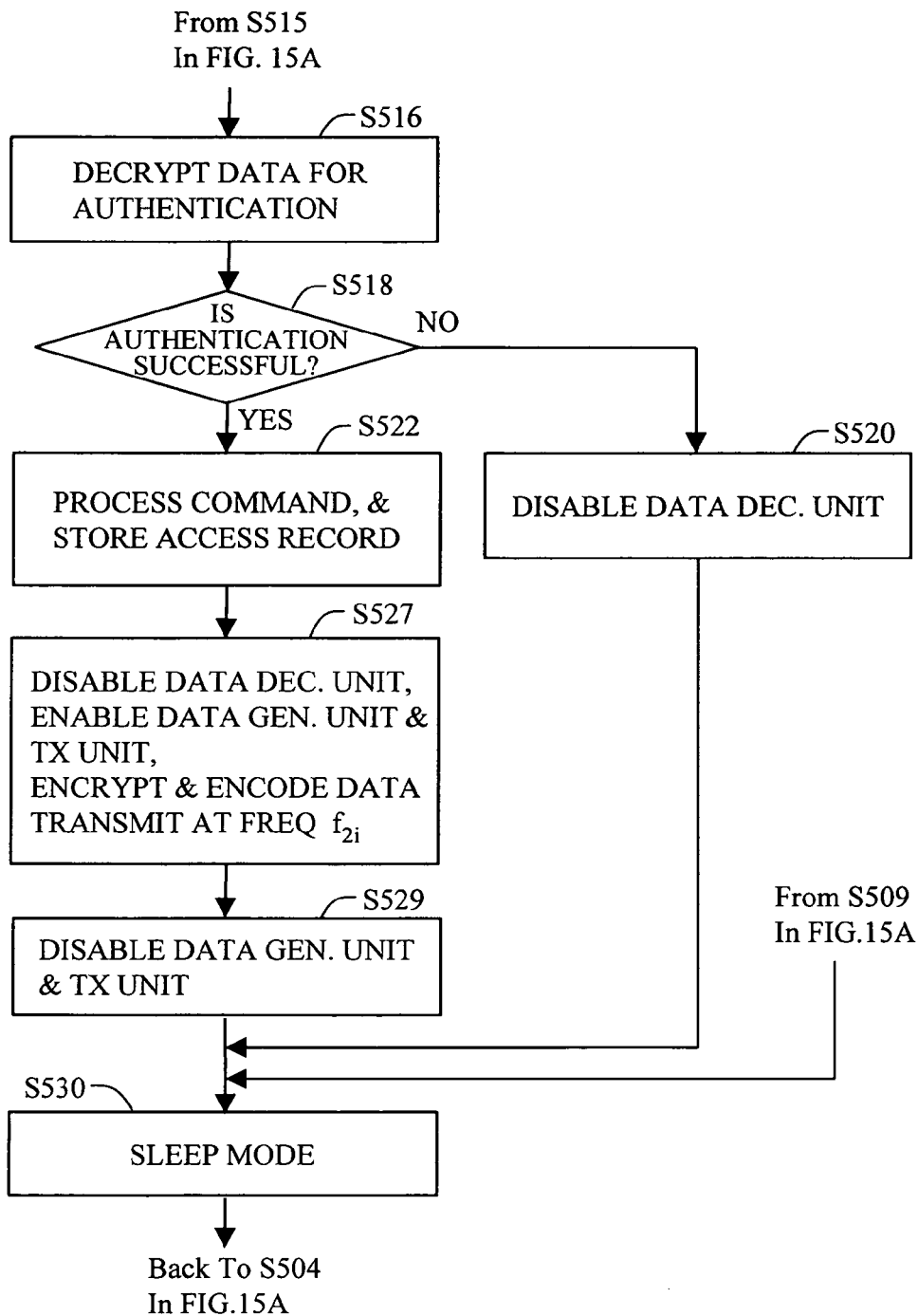

FIGS. 15A and 15B show a flow chart for the processing performed in the active RF ID tag 204.

Referring to FIGS. 15A and 15B, Steps 502-504, 508-520, and 529-530 are the same as those of FIG. 9A, and hence are not described again.

At Step 507, the control unit 210 enables the receiver unit 250 and the carrier determination unit 246 in a short time period of, for example, about 1 to 10 ms, then sets the ordinal number parameter i (=1, 2, or n) such that i=i (mod n)+1 (n is the number of frequencies $f_{1i}$ of the received RF signals), and then tunes or adjusts the receiving frequency of the receiver unit 250 to become the corresponding frequency $f_{1i}$. Accordingly, the receiving frequency $f_{1i}$ is changed cyclically. Then, the receiver unit 250 goes into a state of being ready to receive an RF signal. In accordance with the data indicative of the power intensity of the received RF signal carrier which data is provided by the receiver unit 250, the determination unit 246 determines the presence or absence of a received RF signal carrier, and then provides the resultant determination to the control unit 210.

At Step 527, in accordance with the ID request command, the control unit 210 enables the data generation unit 222 and the transmitter unit 230 in one time slot which is selected at random in accordance with a random number from the predetermined number of time slots within a predetermined period of time. This selected time slot corresponds to the time period of the processing for transmission 56 of FIG. 13G. The data generation unit 222 encrypts the data containing the tag ID (ID_tag) of the RF ID tag 202, the time-of-day information T and the system ID (ID_system) read out from the memory 214, with the encryption key Ke in the response list 215 in accordance with the predetermined cryptosystem. Then, the data generation unit 222 encodes the encrypted data in accordance with the predetermined encoding scheme, and then provides the encoded encrypted data to the transmitter unit 230. The transmitter unit 230 modulates the carrier with the encoded encrypted data, and then transmits via the antenna 284 the RF signal at the frequency $f_{2i}$ associated with the receiving frequency $f_{1i}$ of the received RF signal in the response list 215 (transmission 56 in FIG. 13G).

FIG. 16 shows the configuration of another active RF ID tag 206 in accordance with another embodiment of the invention. The active RF ID tag 206 receives ID request signals and transmits response signals to and from the reader/writer devices 302, 304, 306, 391, 392, ... and 396 in a time division and frequency division manner. The RF ID tag 206 includes a control unit 712, a timer 713, a memory 714 for storing a condition list 715 described later, ID tag units 702, 704 and 706, and antennas 282 and 284. The ID tag unit 702 includes the elements 210-290 enclosed by a broken line shown in FIG. 12. The ID tag units 704 and 706 have the same configuration as the ID tag unit 702. The transmitting frequencies and the receiving frequencies of the ID tag unit 704 are frequencies $f_{24}$-$f_{26}$ and $f_{14}$-$f_{16}$, respectively. The transmitting frequencies and the receiving frequencies of the ID tag unit 706 are frequencies $f_{27}$-$f_{29}$ and $f_{17}$-$f_{19}$, respectively. The reader/writer devices 302, 304, 306 and 391-396 may be connected to respective different host computers, or may be connected to a single host computer.

The reader/writer devices 304, 306 and 391-396 have essentially the same configuration as the reader/writer device 302. The reader/writer devices 302, 304, 306 and 391-396 transmit respective ID request signals at respective frequencies $f_{11}, f_{12}, \ldots, f_{19}$, and receive response signals at respective frequencies $f_{21}, f_{22}, \ldots, f_{29}$. The ID tag units 702, 704 and 706 of the RF ID tag 206 operate simultaneously to sense carriers (52), in a frequency division manner, at the frequencies "$f_{11}$, $f_{14}$ and $f_{17}$" at first, then at the frequencies "$f_{12}$, $f_{15}$ and $f_{18}$", and then at the frequencies "$f_{13}$, $f_{16}$ and $f_{19}$", in this order, and thereby receive ID request signals. In response to these received signals, the ID tag units 702, 704 and 706 transmit response signals, in a frequency division manner, at the frequencies "$f_{21}$, $f_{24}$ and $f_{27}$" at first, then at the frequencies "$f_{22}$, $f_{25}$ and $f_{28}$", and then at the frequencies "$f_{23}$, $f_{26}$ and $f_{29}$", in this order. Any one of the system IDs of the reader/writer devices 302, 304, 306, and 391-396 is different from the others.

FIGS. 17A to 17F show respective time charts of the receive ready states 46 and of processing for reception 48 of respective received RF signals at respective frequencies $f_{21}$, $f_{22}$, $f_{24}$, $f_{25}$, $f_{27}$ and $f_{28}$ in the reader/writer devices 302, 304, 391, 392, 394 and 395. FIGS. 17G-17I show respective time charts of carrier sensing 52, processing for reception 54 of received RF signals, and processing for transmission 56 of RF signals carrying responses in the case of successful authentication in the ID tag units 702, 704 and 706 of the active RF ID tag 206. Transmissions 42 of RF signals at frequencies $f_{11}$-$f_{16}$ from the reader/writer devices 302, 304, 306, and 391-396 are similar to those of FIGS. 13A, 13C and 13E except that further different frequencies are used. Thus, the transmission of these reader/writer devices is not shown in the figures for simplicity. Further, the receive ready states of the reader/writer devices 306, 393 and 396 and the processing for reception of received RF signals at frequencies $f_{23}$, $f_{26}$ and $f_{29}$ are similar to those of FIG. 13F or FIGS. 17A-17F except that different frequencies are used. Thus, the receive ready states and the processing for reception of the reader/writer devices 306, 393 and 396 are not shown in the figures for simplicity.

Similarly to FIGS. 13A, 13C and 13E, the transmitter unit 330 of each of the reader/writer devices 302, 304, 306 and 391-396 transmits an RF signal carrying the command, cyclically at sufficiently short intervals in the successive time slots.

Referring to FIGS. 17G to 17I, the ID tag units 702, 704 and 706 (the receiver unit 250 and the carrier determination unit 246) of the active RF ID tag 206 operate simultaneously or in parallel to sense carriers 52 at the different receiving frequencies "$f_{11}$, $f_{12}$ and $f_{13}$" in this order, at the different receiving frequencies "$f_{14}$, $f_{15}$ and $f_{16}$" in this order, and at the different receiving frequencies "$f_{17}$, $f_{18}$ and $f_{19}$" in this order. When the RF ID tag 206 is not near any of the reader/writer devices 302, 304, 306, and 391-396, the ID tag units 702, 704 and 706 (the carrier determination unit 246) detect no carrier, similarly to the case of FIG. 13G, and hence determine the absence of carriers. In accordance with these determinations, the RF ID tag 204 enters into the sleep mode of operation in a period of time after the carrier sensing 52 of FIGS. 17G-17I.

When the RF ID tag 206 enters the communication ranges of the reader/writer devices 302, 304, 306, and 391-396 at the same time so that the ID tag units 702, 704 and 706 (the receiver unit 250) of the RF ID tag 206 simultaneously receive RF signals at the frequencies $f_{11}$, $f_{14}$ and $f_{17}$, in the period for carrier sensing 52, the ID tag units 702, 704 and 706 (the carrier determination unit 246) detect the carriers of the RF signals at the frequencies $f_{11}$, $f_{14}$ and $f_{17}$ (DT), and then determine the presence of carriers.

In response to the resultant determination of the presence of carriers at the frequencies $f_{11}$, $f_{14}$ and $f_{17}$, the ID tag units 702, 704 and 706 (the receiver unit 250, the data decoding unit 242) receive and demodulate the RF signals in the time period for the immediately subsequent processing for reception 54, then reproduce encoded encrypted data containing the commands. The ID tag units 702, 704 and 706 then look into the response list 215, retrieve the corresponding encryption/decryption keys Ke from the response list 215 in accordance with the receiving frequencies $f_{11}$, $f_{14}$ and $f_{17}$, then decode the data in accordance with the predetermined encoding scheme, then decrypt the encrypted data with the encryption/decryption keys Ke in accordance with the predetermined cryptosystem to thereby reproduce the commands, and then provide the reproduced commands to the control unit 210. In response to each command, each of the ID tag units 702, 704 and 706 (the control unit 210) authenticates the reader/writer devices 302, 391 and the like in accordance with the time-of-day information T and the system ID contained in that command.

When the authentication has been successful, each of the ID tag units 702, 704 and 706 (the data generation unit 222, the transmitter unit 230), in response to that command, generates response data containing the tag ID (ID_tag) retrieved from the memory 214, in a time slot of processing for transmission 56 selected at random within the predetermined period of time. Each of the ID tag units 702, 704 and 706 then encrypts the data with the encryption/decryption key Ke in accordance with the predetermined cryptosystem and encodes the encrypted data in accordance with the predetermined encoding scheme, then modulates the carrier with the response data containing the tag ID. Thus, the ID tag units 702, 704 and 706 transmit RF signals at the specified transmitting frequencies $f_{21}$, $f_{24}$ and $f_{27}$ simultaneously.

Then, similarly, when the ID tag units 702, 704 and 706 (the receiver unit 250) of the RF ID tag 206 simultaneously receive RF signals at the frequencies $f_{12}$, $f_{15}$ and $f_{18}$, in the period for carrier sensing 52, the ID tag units 702, 704 and 706 (the carrier determination unit 246) detect the carriers of the RF signals at the frequencies $f_{12}$, $f_{15}$ and $f_{18}$ (DT), and then determine the presence of carriers. Then, similarly, the ID tag units 702, 704 and 706 (the receiver unit 250, the data decoding unit 242, the control unit 210, the data generation unit 222, the transmitter unit 230) perform the reception, the decoding and the decryption, then perform the authentication, and then perform the encryption and encoding of the response data for simultaneous transmission of response signals at the frequencies $f_{22}$, $f_{24}$ and $f_{28}$.

Then, similarly, when the ID tag units 702, 704 and 706 (the receiver unit 250) of the RF ID tag 206 simultaneously receive RF signals at the frequencies $f_{13}$, $f_{16}$ and $f_{19}$, in the period for carrier sensing 52, the ID tag units 702, 704 and 706 (the carrier determination unit 246) detect the carriers of the RF signals at the frequencies $f_{13}$, $f_{16}$ and $f_{19}$ (DT), and then determine the presence of carriers. Then, similarly, the ID tag units 702, 704 and 706 (the receiver unit 250, the data decoding unit 242, the control unit 210, the data generation unit 222, the transmitter unit 230) perform the reception, the decoding, and the decryption, then perform the authentication, and then perform the encryption and encoding of the response data for simultaneous transmission of response signals at the frequencies $f_{23}$, $f_{26}$ and $f_{29}$.

Referring to FIGS. 17A-17F, the receiver unit 350 of each of the reader/writer devices 302, 304, 306, and 391-396 is always in the receive ready state 46. When the RF ID tag 206 comes near these reader/writer devices so that they receive RF signals at the frequencies $f_{21}$-$f_{29}$, the receiver unit 350 demodulates the received RF signal in the time period of processing for reception 48, and reproduces encoded encrypted data. Then, the data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310.

In this way, the RF ID tag 206 can perform communication simultaneously with a larger number of reader/writer devices in the frequency and time division manner.

Figure 18:
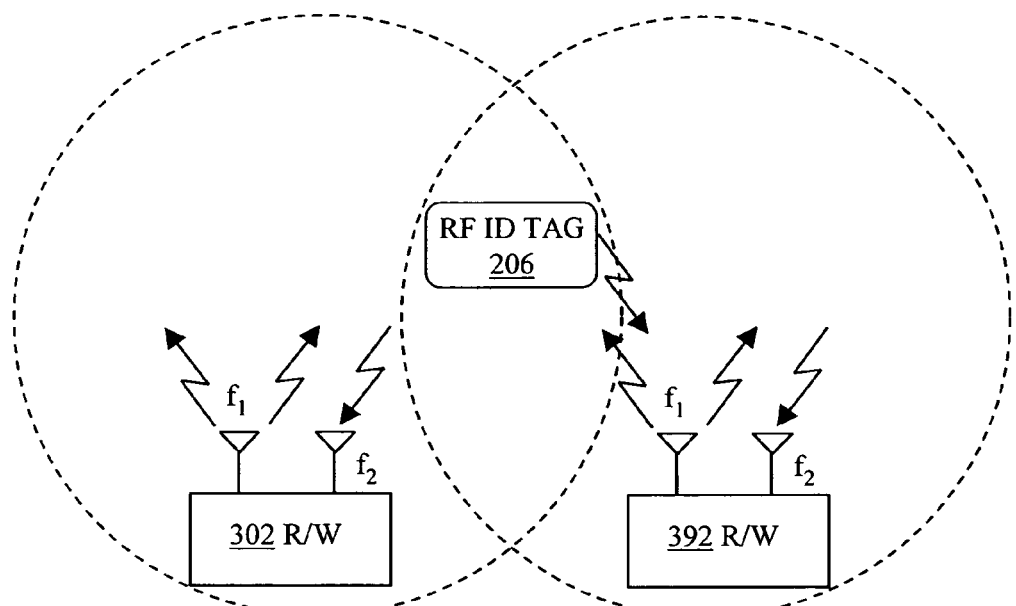
FIG. 18 shows transmission of a conditional response from the RF ID tag in relation to the two reader/writer devices.

FIG. 18 shows transmission of a conditional response from the RF ID tag 206 in relation to the two reader/writer devices 302 and 392. Only when the RF ID tag 206 receives tag ID request signals substantially simultaneously from the reader/writer devices 302 and 392, the RF ID tag 206 transmits a response signal to the reader/writer device 392.

Figure 19:
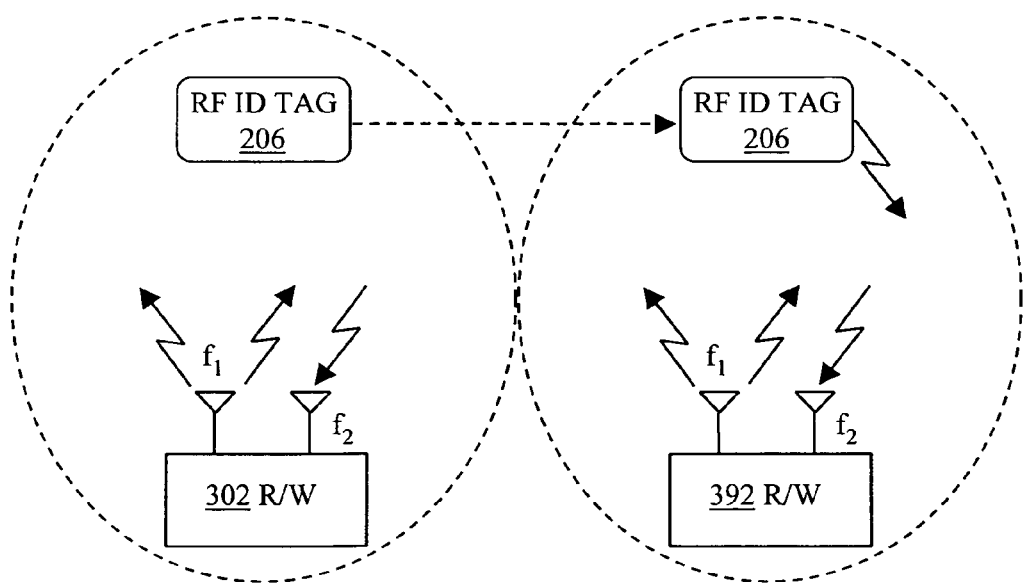
FIG. 19 shows another transmission of a conditional response from the RF ID tag in relation to the two reader/writer devices.

FIG. 19 shows another transmission of a conditional response from the RF ID tag 206 in relation to the two reader/writer devices 302 and 392. Only when the RF ID tag 206 receives a first tag ID request signal from the reader/writer device 302 and then receives a second tag ID request signal from the reader/writer device 392 within a predetermined period of time from the reception of the first tag ID, the RF ID tag 206 transmits a response signal to the reader/writer device 392.

FIG. 20 shows an example of the condition list 715 stored in the memory 714 of the RF ID tag 206 of FIG. 16 or in the memory 214 of the RF ID tag 204 of FIG. 12. The condition list 715 contains entries of conditional reader/writer devices R/W-1 and R/W-2 from which tag ID request commands should be received, an destination reader/writer device (R/W) for an unconditional response, a condition for response, a destination reader/writer device (R/W) for a conditional response, an effective period of the system, and an ON/OFF or active/inactive state of operation of the system.

The entries of the conditional reader/writer devices R/W-1 and R/W-2 indicate the IDs of the reader/writer devices that are used for the logical operation for the conditional response. If the condition for response is a time limit of "TIM-X seconds", the timer 713 for response is activated when the RF ID tag receives a first tag ID request signal from the conditional reader/writer device R/W-1. The entry of the destination reader/writer device (R/W) for unconditional response indicates the ID of the destination reader/writer device to which a response is transmitted without a condition immediately after it receives a tag ID request signal. The condition for response indicates a condition for transmitting a response from the RF ID tag. The condition for response may be a condition of logical operation of IDs of three or more conditional reader/writer devices (R/W). The logical product "AND" indicates that the RF ID tag is required to receive tag ID request signals substantially simultaneously from the conditional reader/writer devices R/W-1 and R/W-2 as shown in FIG. 18. The time limit "TIM-X seconds" indicates that the RF ID tag is required to receive a first tag ID request signal from the conditional reader/writer device R/W-1 and then receives a second tag ID request signal from the conditional reader/writer device R/W-2 within X seconds after the reception of the first tag ID request signal, as shown in FIG. 19. The destination reader/writer device (R/W) for response indicates a destination reader/writer device to which a response is to be transmitted if the condition for response is satisfied. The effective period indicates a term during which the operation for conditional response is effective for the system. The ON/OFF state of operation indicates that the conditional response of operation of the system indicated by the list number is applied when it is an ON state, and is not applied when it is an OFF state.

Figure 21:
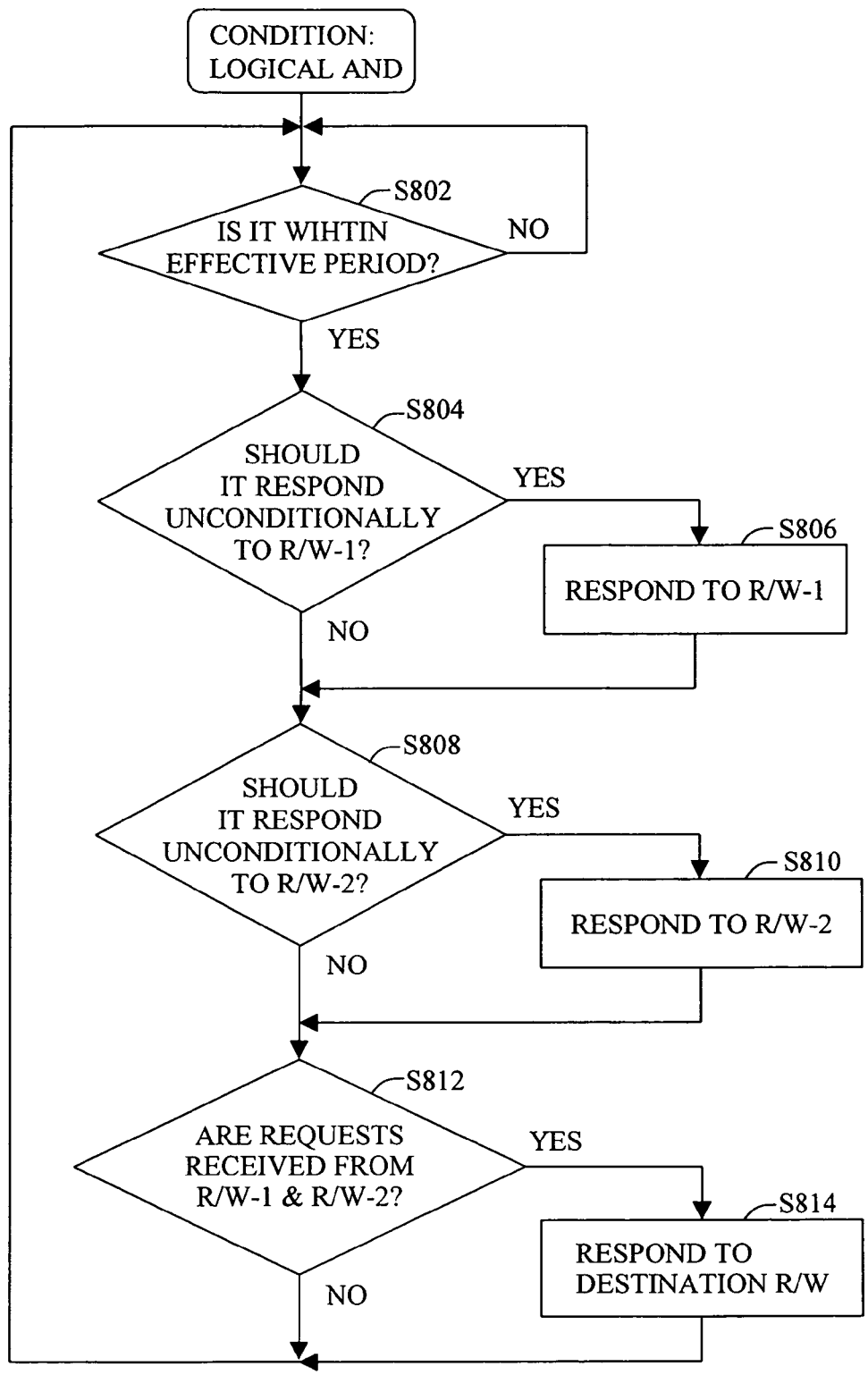
FIG. 21 shows a flow chart for transmitting the conditional response in accordance with the logical product "AND" that is performed by the control unit of the RF ID tag of FIG. 18 or the control unit of the RF ID tag of FIG. 12.

FIG. 21 shows a flow chart for transmitting the conditional response in accordance with the logical product "AND" that is performed by the control unit 712 of the RF ID tag 206 of FIG. 18 or the control unit 210 of the RF ID tag 204 of FIG. 12. This routine is executed when the RF ID tag 206 or 204 receives two predetermined tag ID request signals substantially simultaneously. For example, when the RF ID tag 206 or 204 receives two predetermined tag ID request signals within a predetermined period of time (e.g., within 3 seconds) within one long cycle, it may determine that it has received the two tag ID request signals substantially simultaneously. The following describes the operation of the control unit 712 of the RF ID tag 206. However, the control unit 210 of the RF ID tag 204 operates similarly.

At Step 802, the control unit 712 of the RF ID tag 206 looks into one of the list numbers (e.g., 1) that applies the logical product "AND" as the condition for response in the condition list 715, and then determines whether the present date and time are within the effective period of the conditional response for the list number. If it is determined that the present date and time are within the effective period, the procedure goes to Step 804. If it is determined that the present date and time are not within the effective period, Step 804 is repeated similarly for the next ones of the list numbers (e.g., 2) applying the logical product "AND".

At Step 804, the control unit 712 determines whether the ID of the source reader/writer device 302 or 392 which has transmitted the received tag ID request signal is specified as the conditional reader/writer device R/W-1 (e.g., R/W-A, R/W-C) and also specified as the destination reader/writer device R/W for unconditional response in the condition list 715. For example, if is determined that the ID of the reader/writer device 302 satisfies this condition, the control unit 712 at Step 806 transmits a response signal to the reader/writer device 302 as the reader/writer device R/W-1. If is determined that this condition is not satisfied, the procedure goes to Step 808. In the example of FIG. 20, no destination reader/writer device for unconditional response is specified.

At Step 808, the control unit 712 determines whether the ID of the source reader/writer device 302 or 392 which has transmitted the received tag ID request signal is specified as the conditional reader/writer device R/W-2 (e.g., R/W-B, R/W-D) and also specified as the destination reader/writer device R/W for unconditional response in the condition list 715. For example, if is determined that the ID of the reader/writer device 392 satisfies this condition, the control unit 712 at Step 810 transmits a response signal to the reader/writer device 392 as the reader/writer device R/W-2. If is determined that the condition is not satisfied, the procedure goes to Step 812.

At Step 812, for that list number (e.g., 1 or 2), the control unit 712 determines whether the RF ID tag has received tag ID request signals substantially simultaneously from the reader/writer devices (e.g., R/W-A and R/W-B or R/W-C and R/W-D) specified as the conditional reader/writer devices R/W-1 and R/W-2. If is determined that the tag ID request signals have been received substantially simultaneously, the RF ID tag at Step 814 transmits response signals to the reader/writer devices 302 and 392 specified as the conditional reader/writer devices R/W-1 and R/W-2 as the destinations for conditional response (e.g., R/W-A and R/W-B), or transmits a response signal only to the reader/writer device 392 as the conditional reader/writer device R/W-1 or R/W-2 as the destination for conditional response (e.g., R/W-D). The response signals may be transmitted, in the immediately subsequent response transmission time slots, to the source reader/writer devices that have transmitted the tag ID request signals which have been received simultaneously (e.g., at time 11 seconds in FIGS. 17G and 17H). Alternatively, the one response signal may be transmitted, in the immediately subsequent response transmission time slot, to one of the source reader/writer devices that has transmitted the tag ID request signal which has been received later (e.g., at time 11 seconds in FIG. 17G). On the other hand, the other response is transmitted, in a time slot for response transmission in response to the tag ID request signal which is received in the next long cycle, to the source reader/writer device that has transmitted the tag ID request signal which has been received earlier (e.g., at time 9 seconds in FIG. 17G). If it is determined at Step 812 that the two tag ID request signals have not been received substantially simultaneously, the procedure returns to Step 802.

Figure 22:
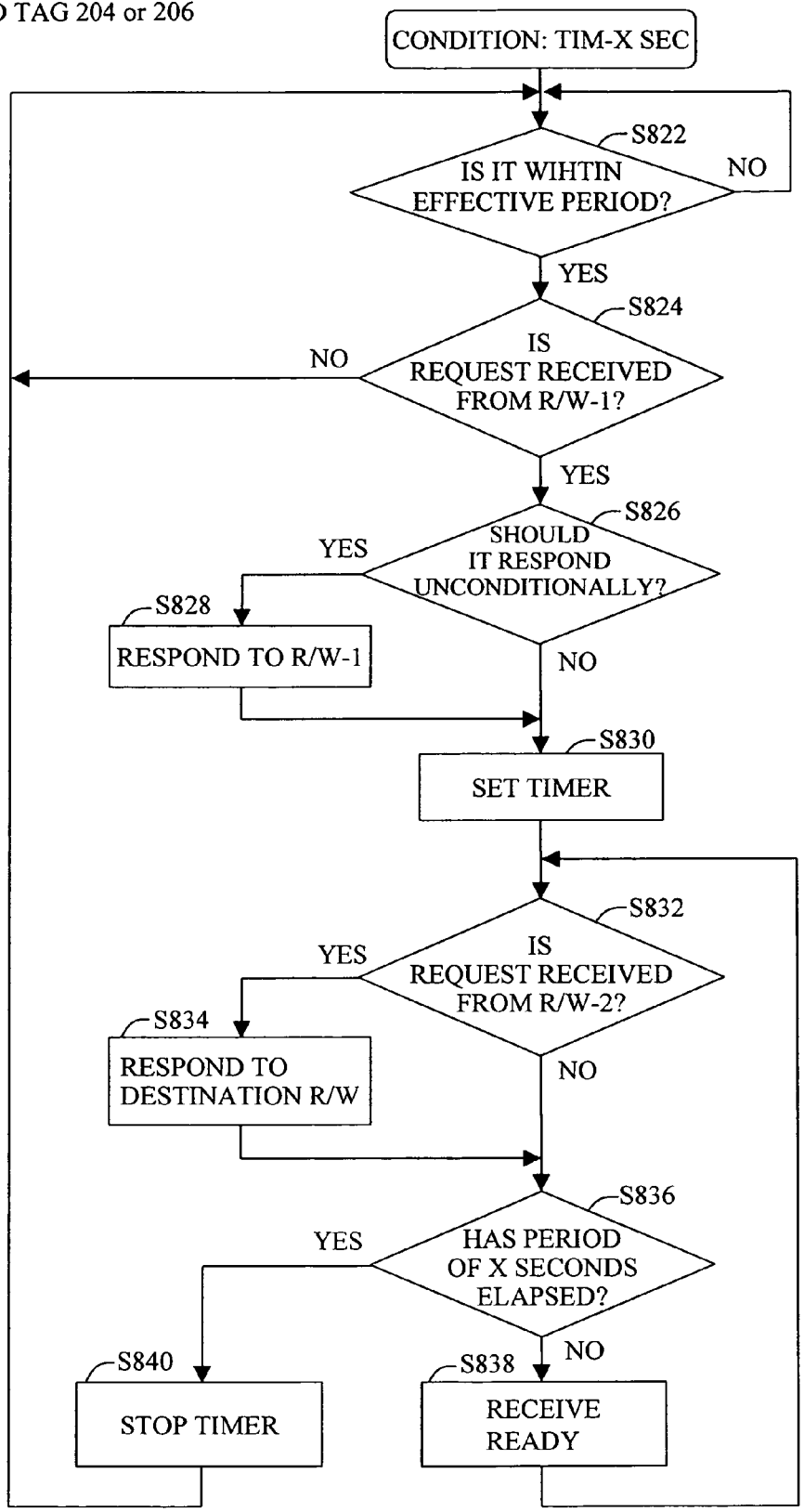
FIG. 22 shows a flow chart for transmitting the conditional response which is performed by the control unit of the RF ID tag of FIG. 19 or the control unit of the RF ID tag of FIG. 12.

FIG. 22 shows a flow chart for transmitting the conditional response which is performed by the control unit 712 of the RF ID tag 206 of FIG. 19 or the control unit 210 of the RF ID tag 204 of FIG. 12. This routine is executed when the RF ID tag 206 or 204 receives a tag ID request signal from the conditional reader/writer device R/W-1 which is related to the condition of time for response "TIM-X seconds". The following describes the operation of the control unit 712 of the RF ID tag 206. However, the control unit 210 of the RF ID tag 204 operates similarly.

At Step 822, the control unit 712 of the RF ID tag 206 looks into one of the list numbers (e.g., 3) that applies a condition of time for response, i.e. the time limit "TIM-X seconds", in the condition list 715, and then determines whether the present date and time are within the effective period of the conditional response for the list number. If it is determined that the present date and time are within the effective period, the procedure goes to Step 824. If it is determined that the present date and time are not within the effective period, Step 822 is repeated similarly for the next ones of the list numbers (e.g., 4).

At Step 824, for that list number (e.g., 1 or 2), the control unit 712 determines whether the RF ID tag has received a tag ID request signal from the reader/writer device (e.g., R/W-E or R/W-G) specified as the conditional reader/writer device R/W-1. If it is determined that it has not been received, the procedure returns to Step 822.

If it is determined at Step 824 that such a tag ID request signal has been received, the control unit 712 at Step 826 determines whether the ID of the source reader/writer device (e.g., the reader/writer device 302) that has transmitted the received tag ID request signal is specified as the destination reader/writer device R/W for unconditional response. If it is determined that the ID of the reader/writer device 302 satisfies this condition (e.g., R/W-E, R/W-G), the control unit 712 at Step 828 transmits a response signal to the reader/writer device 302 as the reader/writer device R/W-1. If it is determined that the condition is not satisfied, the procedure goes to Step 830.

At Step 830, the control unit 712 sets the response condition of the period of X seconds (e.g., 60 seconds) to the timer 713 and causes it to start time counting. At Step 832, for that list number, the control unit 712 determines whether the RF ID tag has received a tag ID request signal from the reader/writer device 392 (e.g., R/W-F or R/W-H) or the like specified as the conditional reader/writer device R/W-2 since the timer setting. If it is determined that such a tag ID request signal has been received, the RF ID tag at Step 834 transmits a response signal to the reader/writer device 392 as the destination reader/writer device R/W-2 for conditional response (e.g., R/W-F or R/W-H). Then, the procedure goes to Step 836. If it determined that such a tag ID request signal has not been received, the procedure goes to Step 836.

At Step 836, the control unit 712 determines whether the period of X seconds has elapsed in the timer 713. If it determined that the period of X seconds has not elapsed, it waits for reception of the next response signal at Step 838. After that, the procedure returns to Step 832. If it determined that the period of X seconds has elapsed, the control unit 712 at Step 840 stops the counting operation of the timer 713. Then, the procedure returns to Step 822.

Thus, the RF ID tag 206 can perform the conditional response in accordance with the condition list 715. This prevents the RF ID tag 206 from transmitting an undesirable response.

Alternatively, the control unit 210 of the RF ID tag 204 may control the conditional response in accordance with the condition list 715.

The setting items (e.g., frequencies, encryption keys, conditions) in the response list 215 and the condition list 715 can be changed from the outside. The change may be performed in such a manner that the setting items are periodically or always included into the request signals transmitted by the reader/writer device 302 or the like to the RF ID tag 204 or 206. The setting items are provided by the host computer to the reader/writer device 302 and the like. Alternatively, the change may be performed in such a manner that a terminal device dedicated for changing settings is connected to the serial port (SP) 720 connected to the control unit 712 or 210 of the RF ID tag 204 or 206 so that the terminal device is operated by an operator for changing the settings. Yet alternatively, the change may be performed in such a manner that a terminal device dedicated for changing settings is connected to the serial port 720 connected to the control unit 712 or 210 so that a permission of changing settings is entered into the control unit 712 or 210, while the setting items are incorporated into the request signals transmitted by the reader/writer device 302 and the like and received by the RF ID tag 204 or 206. The setting items may be inputted through the terminal device dedicated for changing settings or may be pre-stored in the terminal device, or alternatively may be provided by a management server through the terminal device.

The setting items corresponding to those in the response list 215 and the condition list 715 of the RF ID tag are set up also into the reader/writer device 302 and the like by the host computer periodically or if necessary. Further, the setting items related to the active RF ID tag stored in the reader/writer device 302 and the like may be transferred to another reader/writer device 304 or the like and then stored therein through operation by an operator from the outside.

Although the invention has been described in connection with application to the RF ID tags, it should be understood by those skilled in the art that the invention is not limited to this application and is also applicable to contactless IC cards.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information stored in a contactless information storage device, said information access system comprising:

an active contactless information storage device having a memory, a first control unit, a battery, a timer for measuring time, a receiver unit for sensing carriers of RF signals at first and second different frequencies for detection, and a transmitter unit for transmitting a response signal at a third or fourth frequency different from said first and second frequencies in response to reception of an ID request signal, a first reader/writer device connected to an information processing apparatus, and having a second control unit, a second transmitter unit for cyclically transmitting an ID request signal at said first frequency under the control of said second control unit, and a second receiver unit adapted to be continuously ready to receive an RF signal at said third frequency, and a second reader/writer device connected to an information processing apparatus, and having a third control unit, a third transmitter unit for cyclically transmitting an ID request signal at said second frequency under the control of said third control unit, and a third receiver unit adapted to be continuously ready to receive an RF signal at said fourth frequency, wherein said first control unit controls said first receiver unit to sense a carrier of an RF signal at said first frequency in first predetermined periods occurring in a predetermined cycle and sense a carrier of an RF signal at said second frequency in second predetermined periods occurring in said predetermined cycle, when said first receiver unit senses and detects a carrier of an RF signal at one of said first and second frequencies in a particular predetermined period, said first control unit causes said first receiver unit to receive further the ID request signal, and, in response to the ID request signal, causes said first transmitter unit to transmit a response signal at a corresponding one of said third and fourth frequencies that carries an ID of said active contactless information storage device stored in said memory;

in the carrier sensing, said first control unit causes said first receiver unit to be in an active state and said transmitter unit to be in an inactive state in the first and second predetermined periods; and when said first receiver unit attempts to sense a carrier of an RF signal at said first frequency in the first predetermined period but detects no carrier, said first control unit controls said first receiver unit and said first transmitter unit to maintain the inactive state during a non-carrier sensing period between the first predetermined period for carrier sensing and the second predetermined period for subsequent carrier sensing.

2. An information access system for accessing information stored in a contactless information storage device, said information access system comprising:

an active contactless information storage device having a memory, a first control unit, a battery, a timer for measuring time, first and second receiver units for sensing carriers of RF signals at first and second different frequencies for detection, and first and second transmitter units for transmitting respective response signals at third and fourth frequencies different from said first and second frequencies in response to reception of ID request signals, a first reader/writer device connected to an information processing apparatus, and having a second control unit, a third transmitter unit for cyclically transmitting an ID request signal at said first frequency under the control of said second control unit, and a third receiver unit adapted to be continuously ready to receive an RF signal at said third frequency, and a second reader/writer device connected to an information processing apparatus, and having a third control unit, a fourth transmitter unit for cyclically transmitting an ID request signal at said second frequency under the control of said third control unit, and a fourth receiver unit adapted to be continuously ready to receive an RF signal at said fourth frequency, wherein said first control unit controls said first and second receiver units to simultaneously sense carriers of RF signals at said first and second frequencies in predetermined periods occurring in a predetermined cycle, when said first receiver unit senses and detects a carrier of an RF signal at said first frequency in a particular predetermined period, said first control unit causes said first receiver unit to receive further the ID request signal, and, in response to the ID request signal, causes said first transmitter unit to transmit a response signal at said third frequency corresponding to said first frequency that carries an ID of said active contactless information storage device stored in said memory;

when said second receiver unit senses and detects a carrier of an RF signal at said second frequency in the particular predetermined period, said first control unit causes said second receiver unit to receive further the ID request signal, and, in response to the ID request signal, causes said second transmitter unit to transmit a response signal at said fourth frequency corresponding to said second frequency that carries an ID of said active contactless information storage device stored in said memory;

in the carrier sensing, said first control unit causes said first and second receiver units to be in an active state and said first and second transmitter units to be in an inactive state in the particular predetermined period and a subsequent predetermined period;

when said first receiver unit attempts to sense a carrier of an RF signal at said first frequency in the particular predetermined period but detects no carrier, said first control unit controls said first receiver unit and said first transmitter unit to maintain the inactive state during a non-carrier sensing period between the particular predetermined period for carrier sensing and the subsequent predetermined period for subsequent carrier sensing; and when said second receiver unit attempts to sense a carrier of an RF signal at said second frequency in the particular predetermined period but detects no carrier, said first control unit controls said second receiver unit and said second transmitter unit to maintain the inactive state during a non-carrier sensing period between the particular predetermined period for carrier sensing and the subsequent predetermined period for subsequent carrier sensing.

3. An active contactless information storage device comprising:

a memory, a battery, a timer for measuring time, a receiver unit for sensing and detecting carriers of RF signals at first and second different frequencies from a first or second reader/writer device in respective predetermined periods, when said active contactless information storage device is in a communication range of said first or second reader/writer device, a transmitter unit for transmitting a response signal at a third or fourth frequency different from said first and second frequencies, when said receiver unit receives an ID request signal, and a control unit for controlling said receiver unit and said transmitter unit, wherein said control unit controls said receiver unit to sense a carrier of an RF signal at said first frequency in first predetermined periods occurring in a predetermined cycle and sense a carrier of an RF signal at said second frequency in second predetermined periods occurring in said predetermined cycle;

when said receiver unit senses and detects a carrier of an RF signal at one of said first and second frequencies in a particular predetermined period, said control unit causes said receiver unit to receive further the ID request signal, and, in response to the ID request signal, causes said transmitter unit to transmit a response signal at a corresponding one of said third and fourth frequencies that carries an ID of said active contactless information storage device stored in said memory;

in the carrier sensing, said control unit causes said receiver unit to be in an active state and said transmitter unit to be in an inactive state in the first and second predetermined periods; and when said receiver unit attempts to sense a carrier of an RF signal at said first frequency in the first predetermined period but detects no carrier, said control unit controls said receiver unit and said transmitter unit to maintain the inactive state during a non-carrier sensing period between the first predetermined period for carrier sensing and the second predetermined period for subsequent carrier sensing.

4. An active contactless information storage device according to claim 3, wherein when said receiver unit receives RF signals carrying IDs of said first and second reader/writer devices substantially simultaneously, said control unit causes said transmitter unit to transmit a response signal correspondingly at said fourth frequency that carries the ID of said active contactless information storage device stored in said memory.

5. An active contactless information storage device according to claim 3, wherein when said receiver unit receives a first RF signal carrying an ID of said first reader/writer device and then receives a second RF signal carrying an ID of said second reader/writer device within a subsequent predetermined period of time after the reception of said first RF signal, said control unit causes said transmitter unit to transmit a response signal correspondingly at said fourth frequency that carries the ID of said active contactless information storage device stored in said memory.

6. An active contactless information storage device according to claim 3, further comprising:

a decoding unit for decoding an encoded ID request and reproducing the decoded ID request, and an encoding unit for retrieving an ID from said memory, and encoding the ID to generate encoded data, wherein the ID request carried by the ID request signal is encrypted together with the ID of said first or second reader/writer device;

said decoding unit decrypts, together with the ID request, the ID of said first or second reader/writer device;

only when the decrypted ID of said first or second reader/writer device matches with an ID of said first or second reader/writer device stored in said memory, said transmitter unit transmits said response signal; and the ID of said contactless information storage device carried by the response signal is encrypted by said encoding unit.

7. An active contactless information storage device comprising:

a memory, a battery, a timer for measuring time, first and second receiver units for sensing and detecting, in the same predetermined period, carriers of RF signals at first and second different frequencies from a first or second reader/writer device, when said active contactless information storage device is in a communication range of said first or second reader/writer device, first and second transmitter units for transmitting respective response signals at respective third and fourth frequencies different from said first and second frequencies, when said first and second receiver units receive ID request signals, and a control unit for controlling said first and second receiver units and said first and second transmitter units, wherein said control unit controls said first and second receiver units to simultaneously sense carriers of RF signals at said first and second frequencies in predetermined periods occurring in a predetermined cycle;

when said first receiver unit senses and detects a carrier of an RF signal at said first frequency in a particular predetermined period, said control unit causes said first receiver unit to receive further the ID request signal, and, in response to the ID request signal, causes said first transmitter unit to transmit a response signal correspondingly at said third frequency that carries the ID of said active contactless information storage device stored in said memory;

when said second receiver unit senses and detects a carrier of an RF signal at said second frequency in the particular predetermined period, said control unit causes said second receiver unit to receive further the ID request signal, and, in response to the ID request signal, causes said second transmitter unit to transmit a response signal correspondingly at said fourth frequency that carries the ID of said active contactless information storage device stored in said memory;

in the carrier sensing, said control unit causes said first and second receiver units to be in an active state and said first and second transmitter units to be in an inactive state in the particular predetermined period and a subsequent predetermined period;

when said first receiver unit attempts to sense a carrier of an RF signal at said first frequency in the particular predetermined period but detected no carrier, said control unit controls said first receiver unit and said first transmitter unit to maintain the inactive state during a non-carrier sensing period between the particular predetermined period for carrier sensing and the subsequent predetermined period for subsequent carrier sensing; and when said second receiver unit attempts to sense a carrier of an RF signal at said second frequency in the particular predetermined period but detected no carrier, said control unit controls said second receiver unit and said second transmitter unit to maintain the inactive state during a non-carrier sensing period between the particular predetermined period for carrier sensing and the subsequent predetermined period for subsequent carrier sensing.

8. An active contactless information storage device according to claim 7, wherein when said first and second receiver units receive RF signals carrying IDs of said first and second reader/writer devices substantially simultaneously, said control unit causes said second transmitter unit to transmit a response signal correspondingly at said fourth frequency that carries the ID of said active contactless information storage device stored in said memory.

9. An active contactless information storage device according to claim 7, wherein when said first receiver unit receives a first RF signal carrying an ID of said first reader/writer device and then receives a second RF signal carrying an ID of said second reader/writer device within a subsequent predetermined period of time after the reception of said first RF signal, said control unit causes said second transmitter unit to transmit a response signal at corresponding said fourth frequency that carries the ID of said active contactless information storage device stored in said memory.

10. An active contactless information storage device according to claim 7, wherein
    said first receiver unit is operative to sense and detect further, in another predetermined period, a carrier of an RF signal at a fifth frequency different from said first, second, third and fourth frequencies;
    said first transmitter unit is operative to transmit further an RF response signal at a sixth frequency different from said first, second, third, fourth and fifth frequencies;
    said control unit controls said first receiver unit to sense a carrier of an RF signal at said first frequency in first predetermined periods occurring in said predetermined cycle and sense a carrier of an RF signal at said fifth frequency in second predetermined periods occurring in said predetermined cycle;
    when said first receiver unit senses and detects a carrier of an RF signal at said fifth frequency in the second predetermined period, said control unit causes said first receiver unit to receive further the ID request signal, and, in response to the ID request signal, causes said first transmitter unit to transmit a response signal correspondingly at said sixth frequency that carries the ID of said active contactless information storage device stored in said memory;
    in the carrier sensing, said control unit causes said first receiver unit to be in an active state and said first transmitter unit to be in an inactive state in the second predetermined period; and
    when said first receiver unit attempts to sense a carrier of an RF signal at said fifth frequency in the second predetermined period but detects no carrier, said control unit controls said first receiver unit and said first transmitter unit to maintain the inactive state during a non-carrier sensing period between the second predetermined period for carrier sensing and a further predetermined period for subsequent carrier sensing.

11. An active contactless information storage device according to claim 7, further comprising:
    a decoding unit for decoding an encoded ID request and reproducing the decoded ID request, and
    an encoding unit for retrieving an ID from said memory, and encoding the ID to generate encoded data, wherein
    the ID request carried by the ID request signal is encrypted together with the ID of said first or second reader/writer device;
    said decoding unit decrypts, together with the ID request, the ID of said first or second reader/writer device;
    only when the decrypted ID of said first or second reader/writer device matches with an ID of said first or second reader/writer device stored in said memory, said transmitter unit transmits said response signal; and
    the ID of said contactless information storage device carried by the response signal is encrypted by said encoding unit.

* * * * *

UNITED STATES PATENT AND TRADEMARK OFFICE
CERTIFICATE OF CORRECTION

PATENT NO. : 7,536,152 B2
APPLICATION NO. : 11/330173
DATED : May 19, 2009
INVENTOR(S) : Satoshi Inano et al.

Page 1 of 1

It is certified that error appears in the above-identified patent and that said Letters Patent is hereby corrected as shown below:

Title Page, Column 1, Line 16, below
item "(65)    Prior Publication Data

US 2007/0167139 A1 Jul. 19, 2007" insert
item --(30)    Foreign Application Priority Data

Sep. 7, 2005 (JP)........................2005-258886--.

Signed and Sealed this

Sixth Day of October, 2009

David J. Kappos
*Director of the United States Patent and Trademark Office*